United States Patent [19]

Fukuoka

[11] Patent Number: 5,349,680
[45] Date of Patent: Sep. 20, 1994

[54] INFORMATION PROCESSING APPARATUS FOR EXECUTING APPLICATION PROGRAMS UNDER CONTROL OF A SYSTEM PROGRAM

[75] Inventor: Katsuhito Fukuoka, Yokohama, Japan

[73] Assignee: Kabushiki Kaisha Toshiba, Kawasaki, Japan

[21] Appl. No.: 785,828

[22] Filed: Oct. 31, 1991

[30] Foreign Application Priority Data

Nov. 7, 1990 [JP] Japan .................................. 2-299943
Nov. 19, 1990 [JP] Japan .................................. 2-311633

[51] Int. Cl.[5] .............................................. G06F 9/00
[52] U.S. Cl. ...................................... 395/800; 395/425; 395/650; 364/230; 364/230.3; 364/246.11; 364/247; 364/247.7; 364/254.3; 364/281.7; 364/DIG. 1
[58] Field of Search ............... 395/700, 650, 600, 425, 395/375, 800; 235/438

[56] References Cited

U.S. PATENT DOCUMENTS

| | | | |
|---|---|---|---|
| 3,530,438 | 9/1970 | Mellen et al. | 364/200 |
| 3,984,817 | 10/1976 | Barbour et al. | 364/200 |
| 4,189,771 | 2/1980 | Roever | 364/200 |
| 4,325,120 | 4/1982 | Colley et al. | 395/375 |
| 4,750,116 | 6/1988 | Pham et al. | 395/650 |
| 5,050,070 | 9/1991 | Chastain et al. | 395/375 |
| 5,089,956 | 2/1992 | MacPhail | 395/600 |
| 5,126,541 | 6/1992 | Shinagawa | 235/438 |
| 5,127,096 | 6/1992 | Kaneko et al. | 395/425 |
| 5,170,340 | 12/1992 | Prokop et al. | 364/143 |
| 5,175,679 | 12/1992 | Allen et al. | 364/148 |
| 5,179,715 | 1/1993 | Andoh et al. | 395/800 |

OTHER PUBLICATIONS

Hwang et al., "Computer Architecture and Parallel Processing", McGraw-HIll 1984, pp. 590-596.

*Primary Examiner*—Gareth D. Shaw
*Assistant Examiner*—Dennis M. Butler
*Attorney, Agent, or Firm*—Foley & Lardner

[57] ABSTRACT

An information processing apparatus for executing application programs under the control of a system program consists of, memory for storing the system program, context blocks for storing contexts being equivalent to the contents of the application programs, system processor for controlling the execution of the application program stored in the corresponding context block after the next application program to be executed is determined by the execution of the system program, load pointer for pointing out the address of the context block under the control of the system program executed in the system processor, and application processor for executing the application program stored in the corresponding context block of which the address is pointed out by the load pointer.

8 Claims, 15 Drawing Sheets

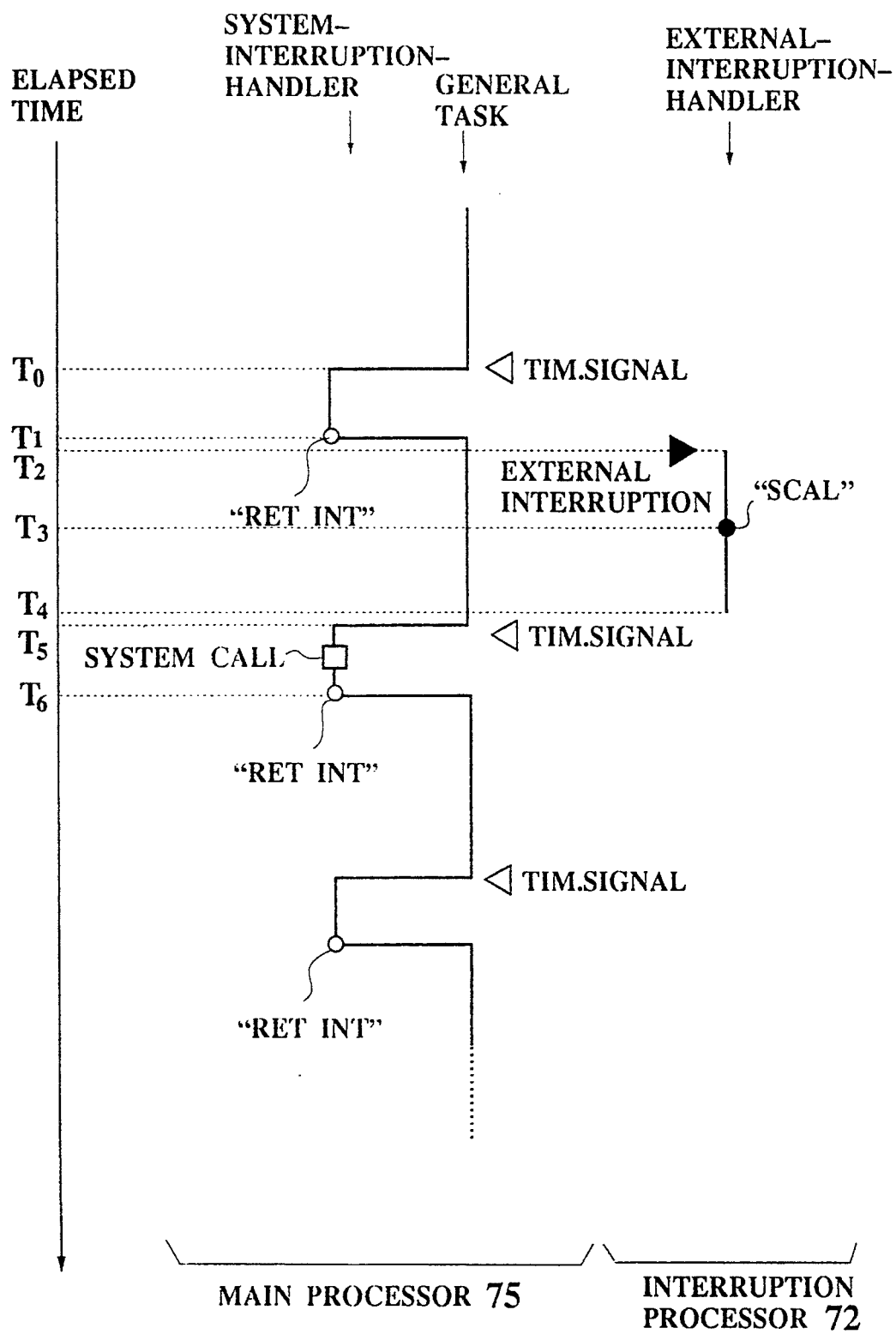

INFORMATION PROCESSING APPARATUS FOR EXECUTING APPLICATION PROGRAMS UNDER CONTROL OF A SYSTEM PROGRAM

BACKGROUND OF THE INVENTION

1. Field of the Invention

The present invention relates to an information processing apparatus which forms a close coupling multi processor system, particularly to an information processing apparatus in which the activity efficiency is improved or an information processing apparatus in which the interruption handling is efficiently executed. In addition, the present invention relates to a method for processing information by utilizing the above information processing means.

2. Description of the Background Art

Conventionally, as shown in FIG. 1, an information processing apparatus 11 comprises a main processor 12 for processing application programs and system programs, a memory 13 for storing the application programs and the system programs, and a bus 14 for transmitting the application programs and the system programs between the main processor 12 and the memory 13.

Moreover, the main processor 12 comprises an internal state memory 15 having a register 16, a stack pointer 17 and a program counter 18, an application supporting unit 19 for supporting the execution of application programs, and a system supporting unit 20 for supporting the execution of system programs.

Specifically, the application supporting unit 19 is a memory controller or a floating point arithmetic unit. The system supporting unit 20 is an execution unit for executing special instructions in the system program.

The application program is a main operation program for operating the information processing apparatus 11 as a main purpose. On the other hand, the system program is a control program for controlling the operation in the information processing apparatus 11. The system program is executed as an interruption handling when the application program is in execution.

Further, the memory 13 comprises a plurality of context blocks 21 (21a, 21b, and 21c) for storing contents of the internal state memory 15. The contents stored in the internal state memory 15 are called a context. In other words, a context is made up of the contents of the register 16, the stack pointer 17 and the program counter 18 in the main processor 12 with the register 16, the stack pointer 17 and the program counter 18.

The number of the context blocks 21 is equal to the number of the application programs which are executed in the main processor 12. That is, each context block 21 corresponds to an application program.

In the above configuration of the information processing apparatus 11, one application program is executed in the main processor 12 to renew the content of the internal state memory 15 according to the instruction of the application program. That is, the application program is executed to renew the contents of the register 16, the stack pointer 17 and the program counter 18 while being supported by the application supporting unit 19.

Therefore, the contents of the internal state memory 15 reflect what is executed in the main processor 12. That is, in the case where the execution in the internal state memory 15 is suspended and the contents of the internal state memory 15 are stored in a corresponding context block 21 at a time T, the execution can be resumed from the suspended state of the contents at a prescribed time after the suspended contents stored in the corresponding context block 21 are restored in the internal state memory 15.

In the case where a plurality of application programs are respectively executed in time sharing in the main processor 12, the contents of one application program are stored in a corresponding context block 21 when another application program is executed in the main processor 12.

FIG. 2 is one example of a time chart showing the execution of application program 1, application program 2, and a system program in time sharing.

For the above execution, as shown in FIG. 1, a context CTX1 which is the contents of the application program AP1 can be stored in a context block 21a. In the same manner, a context CTX2 which Is the contents of the application program AP2 can be stored In a context block 21b and a context CTX3 which is the contents of the application program AP3 can be stored in a context block 21c.

As shown in FIG. 2, In the case where an request for replacing the application program AP1 with another application program occurs when the application program AP1 is in execution in the main processor 12, the execution of a specific Instruction in the application program AP1 is suspended so that a system program SP is executed to handle the request while being supported by the supporting unit 20. By the execution of the system program SP, the next application program to be executed is determined.

In the case where the execution of the application program AP1 is replaced with the execution of the application program AP2, the context CTX1 is transmitted to the context block 21a from the internal state memory 15 so that the execution of the application program AP1 is suspended. And then, by the execution of the system program SP, the context CTX2 stored in the context block 21b is transmitted to the internal state memory 15 so that the application program AP2 is executed.

In the case where the execution of the application program AP1 is resumed from the suspended state of the program AP1, under the control of the system program, the context CTX2 is transmitted to the context block 21b from the internal state memory 15 and the context CTX1 stored in the context block 21a is transmitted to the internal state memory 15. Therefore, the specific instruction in the application program AP1, which has been suspended by the system program, is executed.

In summary, a plurality of application programs are respectively executed in time sharing in the main processor 12 and the system program Is executed to handle the request.

Accordingly, in the conventional information processing apparatus 11, a plurality of application programs and the system program can respectively be executed in time sharing in the main processor 12.

However, the application supporting unit 19 is not utilized when the system program is executed. In the same manner, the system supporting unit 20 is not utilized when the application program is executed. In other words, when the system program is executed, the application program cannot be executed.

Therefore, the activity efficiency of the supporting units 19, 20 attached to the main processor 12 is inferior.

Next, a second conventional information processing apparatus 31 is explained with reference to FIGS. 3, 4.

In the information processing apparatus 31, an external interruption signal is provided from outside the information processing apparatus 31, while the request for replacing the application program is provided from an internal unit in the first conventional information processing apparatus 11.

As shown in FIG. 3, a main processor 32 is connected with a signal line to which an external interruption signal is transmitted. Therefore, in the case where the external interruption signal is not provided to the main processor 32, a general task which belongs to the group of the application programs is executed in the main processor 32. On the other hand, In the case where the external interruption signal is provided to the main processor 32, the execution of the general task is suspended so that an external-interruption-handler, which belongs to the group of the application programs, is executed in the main processor 32 to process the contents designated by the external interruption signal.

The contents of the external-interruption-handler are normally simpler than those of the general task. Therefore, the execution of the general task is resumed after the execution of the external-interruption-handler is finished in the main processor 32. The replacement of the application programs is shown in FIG. 4.

FIG. 4 is a time chart showing the replacement of the application programs between the general task and the external-interruption-handler.

However, as shown in FIG. 4, as for a register utilized for executing the external-interruption-handler, the contents stored in the register must be saved somewhere when the external-interruption-handler is executed. In addition, the saved contents of the register must be restored to the register when the execution of the external-interruption-handler is finished. That is, a first instruction in the external-interruption-handler is a "SAVE" instruction and a final instruction Is a "RESTORE" instruction.

Therefore, the handling time for handling the external-interruption-handler is prolonged. Moreover, the "SAVE" and "RESTORE" instructions must be executed for each operation of the external-interruption-handler.

Accordingly, the execution in the external-interruption-handler is inefficient.

Moreover, because the execution of the general task is suspended for the provision of each external interruption signal, the execution time of the genera/task is influenced by the provision frequency of the external Interruption signals.

Further, the external-interruption-handler is easily handled. On the other hand, a high level function such as a floating point function, a pipe line function, or the like is recently required in the main processor 32. Therefore, many functions unnecessary for executing the external-interruption-handler exist in the main processor 32.

Therefore, in the case where the external-interruption-handler is executed, the main processor is monopolized by the external-interruption-handler so that the utilization of the high level functions in the main processor 32 is inefficient.

SUMMARY OF THE INVENTION

A first object of the present invention is to provide, with due consideration to the drawbacks of such a conventional information processing apparatus, an information processing apparatus in which the activity efficiency of supporting units is superior to that of a conventional information processing apparatus.

A second object of the present invention is to provide, with due consideration to the drawbacks of such a conventional information processing apparatus, an information processing apparatus in which high level functions in the main processor are efficiently utilized.

The first object is achieved by the provision of an information processing apparatus for executing application programs under control of a system program, comprising:

memory means for storing the system program;

context blocks for storing contexts being equivalent to the contents of the application programs, each context block corresponding to a context;

system control means for controlling the execution of the application program stored in the corresponding context block while being supported by a system supporting unit after a next application program to be executed is determined by the execution of the system program;

load pointing means for pointing out the address of the context block under the control of the system program executed in the system control means, the address of the context block pointed out by the load pointing means being replaced when the next application program is determined under the control of the system program executed in the system control means; and application program executing means for executing the application program stored in the corresponding context block of which the address is pointed out by the load pointing means while being supported by an application supporting unit, the application program being executed until the next application program is determined in the system control means and being replaced with the next application program.

In the above configuration, when a request for replacing the application program is provided to the system control means during the execution of an application program in the application program executing means, the next application program to be executed in the application program executing means is determined by the system program executed in the system control means.

In this case, during the execution of the system program to determine the next application program, the execution of the application program is continued while being supported by an application supporting unit. That is, the execution of the application program is not prevented by the execution of the system program in the system control means.

When the next application program to be executed in the application program executing means is determined by the system control means, the address of the context block pointed out by the load pointing means is replaced with the address of another context block according to the determination of the system control means.

At this time, the application program in execution in the application program executing means is replaced with another application program which is stored in the corresponding context block of which the address is pointed out by the load pointing means.

Therefore, the execution of the application program in the application program executing means is suspended when the application program is replaced. However, the time required for suspending the execution of the application program is significantly small in comparison with the time for determining the next application program to be executed in the application program executing means.

After the application program is replaced with the next application program in the application program executing means, the execution of the application program is resumed under the control of the system program executed in the system control means.

Accordingly, because the application supporting unit is arranged to be operated independently of the operation of the system supporting unit, the operation of the application program executing means is not prevented by the execution of the system control means so that the application program executing means can substantially be executed continuously.

Therefore, not only the application program executing means but also the application supporting unit can efficiently be utilized.

Moreover, because the application program executing means and the application supporting unit can efficiently be utilized, the amount of the processed application program increases so that not only the system control means but also the system supporting unit can efficiently be utilized.

It is preferred that the load pointing means consist of a plurality of load pointers for pointing out the addresses of a plurality of context blocks; and the application program executing means consist of a plurality of application processors, each application processor corresponding to a load pointer and executing an application program stored in a context block of which the address is pointed out by the load pointer.

In the above configuration, a plurality of application programs are independently executed. That is, an address of a context block in which the corresponding application program is stored is written in a load pointer, and then the application program is transmitted to a prescribed application processor corresponding to the load pointer.

Accordingly, a plurality of application programs can be simultaneously executed in a plurality of application processors. Therefore, the effective utilization of the system supporting unit and the application supporting units is increased.

Moreover, it is preferred that the application program executing means comprise:

a register for registering the address of the context block pointed out by the load pointing means when a swap-out request signal is provided to the application program executing means from the system control means after the next application program is determined; and an internal state memory for storing the context stored in the context block of which the address is registered in the register when a swap-in request signal is provided to the application program executing means from the system control means after the swap-out request signal is provided and for executing the context while being supported by the application supporting unit, the internal state memory providing the context to the corresponding context block of which the address is registered in the register when a next swap-out request signal is provided to the application program executing means from the system control means.

In the above configuration, a swap-out request signal is provided to the application program executing means from the system control means after the next application program is determined by the system program executed in the system control means. When the swap-out request signal is received by the application program executing means, the execution of the application program is suspended. The suspended context executed in the internal state memory is then provided to the corresponding context block of which the address is registered in the register.

At this time, the address designating the context block which is written in the load pointing means is replaced with a new address under the control of the system control means. Thereafter, when a swap-in request signal is provided to the application program executing means from the system control means, the new address is registered in the register and a new application program stored in a context block designated by the new address is transmitted to the internal state memory. The execution of the new application program is then resumed.

Further, it is preferable that the system supporting unit be an execution unit for executing special instructions of the system program.

Furthermore, it is preferable that the application supporting unit be a memory controller or a floating point arithmetic unit The second object is achieved by the provision of an information processing apparatus for processing an external interruption provided from the outside thereof by utilizing application programs under the control of system programs, comprising:

memory means for storing the system programs such as a system-interruption-handler and the application programs such as a general task, an interruption task and an external-interruption-handler executed in the interruption processing means;

interruption processing means for processing a simple part of the process requested by the external interruption by means of the execution of the external-interruption-handler stored in the memory means and outputting a wake parameter for requesting the execution of the interruption task stored in the memory means by executing a "WAKE" instruction programmed in the external-interruption-handler;

a wake address for storing the wake parameter output by the interruption processing means;

timer means for generating timer interruption signals at regular intervals; and main processing means for executing the general task stored in the memory means when no timer interruption signal is provided from the timer means, executing the system-interruption-handler stored in the memory means to judge whether or not the wake parameter is stored in the wake address by reading the contents of the wake address when the timer interruption signal is provided from the timer means, and processing remaining parts of the process requested by the external interruption by the execution of the interruption task stored in the memory means in the case where it is Judged that the wake parameter is stored in the wake address.

In the above configuration, when an external interruption which can easily be processed by the interruption processing means alone is provided to the interruption processing means, the external interruption is processed by the interruption processing means alone. However, when an external interruption which cannot be processed by the interruption processing means alone is provided to the interruption processing means, a simple part of the process external interruption is processed by executing the external-interruption-handler in the interruption processing means. And, the remaining parts of the process requested by the external interruption are processed by executing the interruption task in the main processing means.

In detail, when an external interruption is provided to the interruption processing means, a wake parameter for requesting the execution of the interruption task by executing a "WAKE" instruction programmed in the external-interruption-handler is transmitted to the wake address to process the remaining parts of the process requested by the external interruption while the simple part of the process requested by the external interruption is processed in the interruption processing means.

In the main processing means, in the case where no external interruption is provided to the interruption processing means, the general task is normally executed. And, when a timer interruption signal is provided to the main processing means, the system-interruption-handler is executed after interrupting the general task. Thereafter, when the execution of the system-interruption-handler is finished, the execution of the general task is resumed.

On the other hand, in the case where an external interruption is provided to the interruption processing means, the existence of the external interruption is detected by reading the contents of the wake parameter. Therefore, the interruption task is executed to process the remaining parts of the process requested by the external interruption after the system-interruption-handler is interrupted.

Accordingly, even if an external interruption which cannot be processed by the interruption processing means alone is provided to the interruption processing means, the external interruption can be efficiently processed.

The second object, which is achieved by utilizing the above configuration, is achieved by the provision of a method for processing an external interruption provided from outside an information processing apparatus by utilizing application programs under the control of system programs in the information processing apparatus, comprising:

storing the system programs such as a system-interruption-handler and the application programs such as a general task, an interruption task and an external-interruption-handler in a common memory;
arranging a wake address in the common memory;
generating timer interruption signals at regular intervals in a timer;
processing a simple part of the process requested by the external interruption in an interruption processor by means of the execution of the external-interruption-handler stored in the common memory;
outputting a wake parameter for requesting the execution of an interruption task from the interruption processor to the wake address by executing a "WAKE" instruction programmed in the external-interruption-handler;
storing the wake parameter output by the interruption processor in the wake address;
executing the general task when no timer interruption signal is provided from the timer and executing the system-interruption-handler to judge whether or not the wake parameter is stored in the wake address arranged in the common memory by reading the contents of the wake address when the timer interruption signal is provided from the timer; and
processing remaining parts of the process requested by the external interruption by means of the execution of the interruption task stored in the common memory in the case where it is judged that the wake parameter is stored in the wake address.

Moreover, the second object is achieved by the provision of an information processing apparatus for processing an external interruption provided from the outside thereof by utilizing application programs under the control of system programs and executing a prescribed system call, comprising:

memory means for storing the system programs such as a system-interruption-handler and the application programs such as a general task and an external-interruption-handler;
interruption processing means for processing the external interruption by the execution of the external-interruption-handler stored in the memory means and outputting a system call parameter for requesting the execution of a prescribed system call by executing a "SCAL" instruction programmed in the external-interruption-handler according to the contents of the external interruption;
a system call address for storing the system call parameter output by the interruption processing means;
timer means for generating timer interruption signals at regular intervals; and
main processing means for executing the general task stored in the memory means when no timer interruption signal is provided from the timer means and executing the system-interruption-handler stored in the memory means when a timer interruption signal is provided from the timer means, the type of system call being judged by reading the contents of the system call parameter stored in the system call address during the execution of the system-interruption-handler and the system call being executed corresponding to the type of the system call.

In the above configuration, a prescribed system call is executed in the main processing means according to the contents of an external interruption provided to the interruption processing means while the other contents of the external interruption are executed in the interruption processing means.

In detail, when the external interruption is provided to the interruption processing means, the contents of the external interruption, except for the contents related to the system call, are processed by executing the external-interruption-handler. To process the contents of the external interruption related to the system call, a system call parameter for requesting the execution of the prescribed system call is transmitted to the system call address arranged in the memory means by executing the "SCAL" instruction programmed in the external-interruption-handler according to the contents of the external interruption.

Thereafter, when a timer interruption signal is provided to the main processing means from the timer means, the system-interruption-handler is executed in the main processing means so that the system call parameter is read out from the system call address. After reading the system call parameter, the type of system call corresponding to the system call parameter is judged and the system call is executed.

Accordingly, the prescribed system call can be easily executed in the information processing apparatus even if the system call cannot be executed in the interruption processing means because the contents of the system call are complicated. Therefore, the interruption processing means can be effectively operated even if the interruption processing means is made up by a small structure.

Moreover, the second object, which is achieved by utilizing the above configuration, is achieved by the provision of a method for processing an external interruption provided from outside an information processing apparatus by utilizing application programs under the control of system programs and executing a prescribed system call in the information processing apparatus, comprising:

storing the system programs such as a system-interruption-handler and the application programs such as a general task and an external-interruption-handler in a common memory;

arranging a system call address in the common memory;

processing the external interruption by the execution of the external-interruption-handler in an interruption processor;

outputting a system call parameter for requesting the execution of a prescribed system call from the interruption processor by executing a "SCAL" instruction programmed in the external-interruption-handler according to the contents of the external interruption;

storing the system call parameter output by the interruption processor in the system call address;

generating timer interruption signals at regular intervals in a timer; and executing the general task stored in the common memory when no timer interruption signal is provided from the timer and executing the system-interruption-handler stored in the common memory when a timer interruption signal is provided from the timer in a main processor;

reading the system call parameter stored in the system call address when the system-interruption-handler is executed in the main processor;

judging the type of system call in the main processor; and executing the system call corresponding to the system call parameter in the main processor.

Further, the second object is achieved by the provision of an information processing apparatus for processing an external interruption provided from the outside thereof by utilizing application programs under the control of system programs, comprising:

memory means for storing the system programs such as a system-interruption-handler and the application programs such as a general task, an interruption task and an external-interruption-handler;

interruption processing means for processing a simple part of the process requested by the external interruption by the execution of the external-interruption-handler stored in the memory means and outputting a wake parameter for requesting the execution of the interruption task stored in the memory means by executing a "WAKE" instruction programmed in the external-interruption-handler; and main processing means, having a delay interruption register, for executing the general task stored in the memory means when the contents of the delay interruption register are an initial value and executing the system-interruption-handler stored in the memory means when the contents registered in the delay interruption register are replaced with the value of the wake parameter by the execution of the "WAKE" instruction in the interruption processing means, remaining parts of the process requested by the external interruption being processed by the execution of the interruption task stored in the memory means when the system-interruption-handler is executed.

In the above configuration, when an external interruption which can easily be processed by the interruption processing means alone is provided to the interruption processing means, the external interruption is processed by the interruption processing means alone. However, when an external interruption which cannot be processed by the interruption processing means alone is provided to the interruption processing means, a simple part of the process requested by the external interruption is processed by executing the external-interruption-handler in the interruption processing means. And, the remaining parts of the process requested by the external interruption are processed by executing the interruption task in the main processing means.

In detail, when an external interruption is provided to the interruption processing means, a wake parameter for requesting the execution of the interruption task by executing a "WAKE" instruction programmed in the external-interruption-handler is transmitted to the delay interruption register to process the remaining parts of the process requested by the external interruption while the simple part of the process requested by the external interruption is processed in the interruption processing means.

In the main processing means, in the case where no external interruption is provided to the interruption processing means, the general task is normally executed. On the other hand, in the case where an external interruption is provided to the interruption processing means, the existence of the external interruption is immediately detected because the wake parameter is written in the delay interruption register arranged in the main processing means.

Therefore, the interruption task is rapidly executed to process the remaining parts of the process requested by the external interruption after the system-interruption-handler is interrupted.

Accordingly, when the request for executing the interruption task occurs because the external interruption is provided to the interruption processing means, the request can be rapidly transmitted to the main processing means. That is, the interruption task can be rapidly executed to process the remaining parts of the operation requested by the external interruption.

Further, the second object, which is achieved by utilizing the above configuration, is achieved by the provision of a method for processing an external interruption provided from outside an information processing apparatus by utilizing application programs under the control of system programs, comprising:

storing the system programs such as a system-interruption-handler and the application programs such as a general task, an interruption task and an external-interruption-handler in a common memory;

arranging a delay interruption register in a main processor and setting the contents of the delay interruption register to an initial value;

processing a simple part of the process requested by the external interruption by the execution of the external-interruption-handler in an interruption processor;

outputting a wake parameter for requesting the execution of the interruption task from the interruption processor to the delay interruption register by executing a "WAKE" instruction programmed in the external-interruption-handler;

executing the general task in the main processor when the contents of the delay interruption register are the initial value and executing the system-interruption-handler in the main processor when the contents of the delay interruption register are replaced with the value of the wake parameter by the execution of the "WAKE" instruction, remaining parts of the process requested by the external interruption being processed by the execution of the interruption task when the system-interruption-handler is executed.

Furthermore, the second object is achieved by the provision of an information processing apparatus for processing an external interruption provided from the outside thereof by utilizing application programs under the control of system programs, comprising:

memory means for storing the system programs such as a system-interruption-handler and the application programs such as a general task and an interruption task;

local memory means for storing an external-interruption-handler belonging to the application program, the local memory means being arranged on a scale considerably smaller than the memory means;

interruption processing means for processing a simple part of the process requested by the external interruption by the execution of the external-interruption-handler read out from the local memory means and outputting a wake parameter for requesting the execution of an interruption task by executing a "WAKE" instruction programmed in the external-interruption-handler;

main processing means, having a delay interruption register, for executing the general task stored in the memory means when the contents of the delay interruption register are an initial value and executing the system-interruption-handler stored in the memory means when the contents of the delay interruption register are replaced with the value of the wake parameter by the execution of the "WAKE" instruction in the interruption processing means, remained parts of the process requested by the external interruption being processed by the execution of the interruption task stored in the memory means when the system-interruption-handler is executed; and program transmitting means for transmitting the system-interruption-handler, the general task and the interruption task between the memory means and the main processing means.

In the above configuration, when an external interruption is provided to the interruption processing means, the external-interruption-handler is read out from the local memory means without passing through the program transmitting means and is executed in the interruption processing means for processing a simple part of the process requested by the external interruption in the interruption processing means.

During the execution of external-interruption-handler, a "WAKE" instruction programmed in the external-interruption-handler is executed to transmit a wake parameter for requesting the execution of the interruption task to the delay interruption register arranged in the main processing means.

In the main processing means, in the case where no external interruption is provided to the interruption processing means, the general task is normally executed. On the other hand, in the case where an external interruption is provided to the interruption processing means, the existence of the external interruption is immediately detected because the wake parameter is written in the delay interruption register.

Therefore, the remaining parts of the process requested by the external interruption are processed by executing the interruption task in the main processing means.

Accordingly, because the external-interruption-handler is read to the interruption processing means without passing through the program transmitting means, a large number of programs are not transmitted in the program transmitting means. As a result, the operations in the main processing means and the interruption processing means can be prevented from interfering with one another.

Furthermore, the second object, which is achieved by utilizing the above configuration, is achieved by the provision of a method for processing an external interruption provided from outside an information processing apparatus by utilizing application programs under the control of system programs, comprising:

storing the system programs such as a system-interruption-handler and the application programs such as a general task and an interruption task in a common memory;

storing an external-interruption-handler belonging to the application program in a local memory, the local memory being arranged on a scale considerably smaller than the common memory;

arranging a delay interruption register in a main processor and setting the contents of the delay interruption register to an initial value;

processing a simple part of the process requested by the external interruption in an interruption processor by the execution of the external-interruption-handler;

outputting a wake parameter for requesting the execution of the interruption task from the interruption processor to the delay interruption register by executing a "WAKE" instruction programmed in the external-interruption-handler; and executing the general task when the contents of the delay interruption register are the initial value and executing the system-interruption-handler when the contents of the delay interruption register are replaced with the value of the wake parameter by the execution of the "WAKE" instruction, remaining parts of the process requested by the external interruption being processed by the execution of the interruption task when the system-interruption-handler is executed.

BRIEF DESCRIPTION OF THE DRAWINGS

FIG. 16 is a time chart showing a procedure for executing a system-interruption-handler.

DETAILED DESCRIPTION OF THE PREFERRED EMBODIMENTS

Preferred embodiments according to a first aspect of the present invention to achieve the first object are described with reference to FIGS. 5 to 9.

Figure 1:
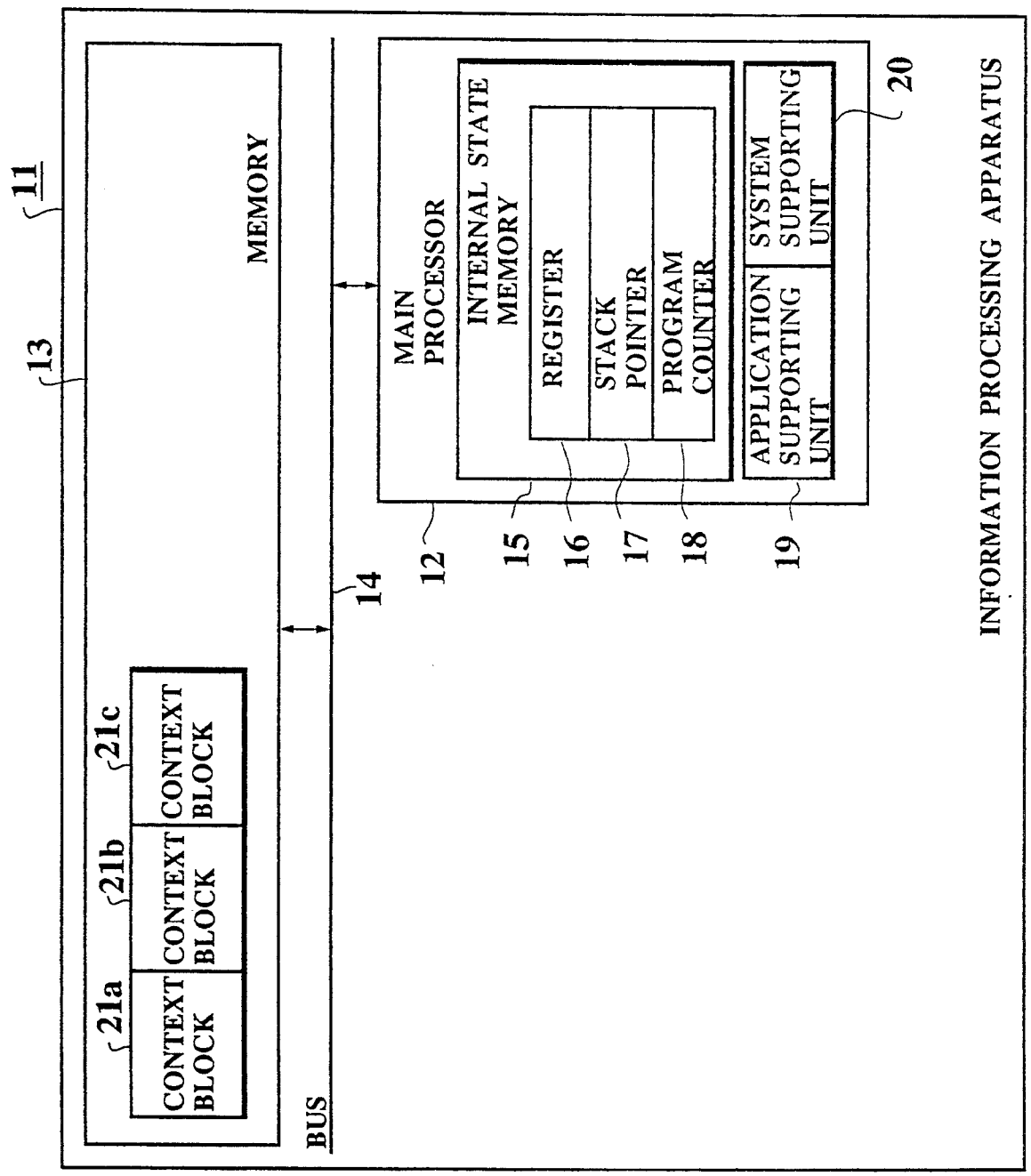
FIG. 1 is a block diagram of a first conventional information processing apparatus.
Figure 2:
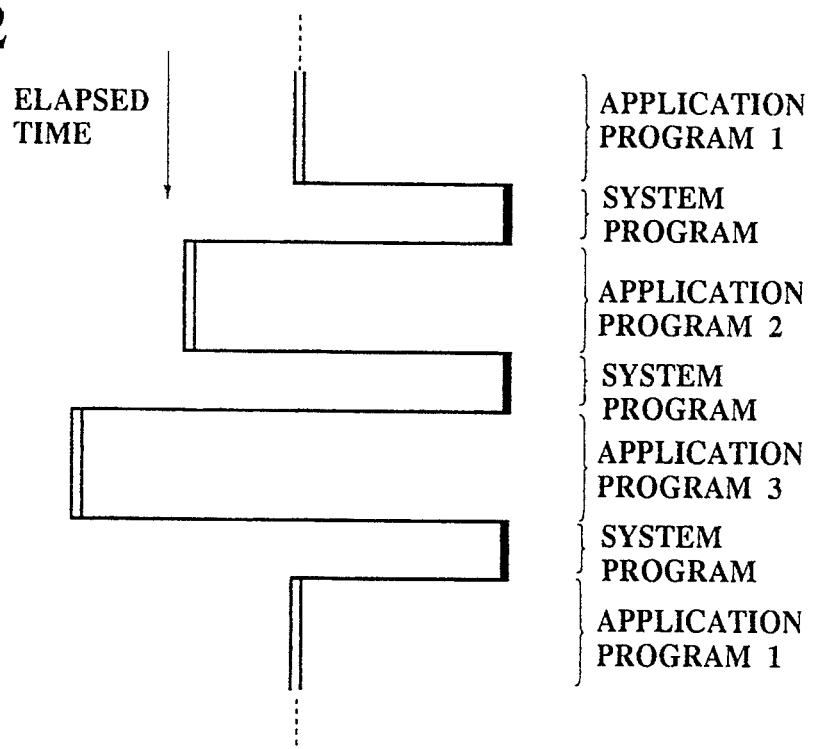
FIG. 2 is one example of a time chart showing the execution of an application program 1, an application program 2, an application program 3, and a system program under time sharing in the information processing apparatus shown in FIG. 1.
Figure 3:
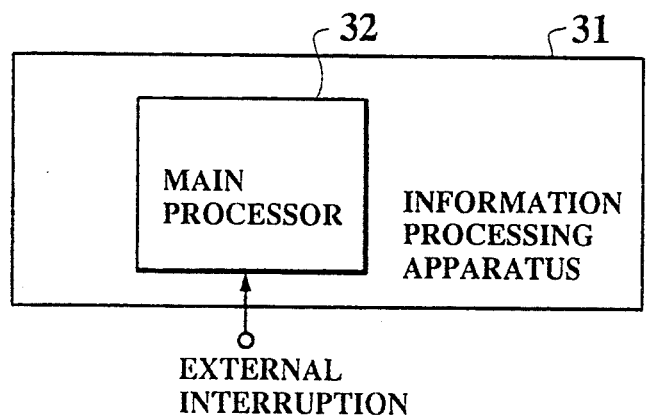
FIG. 3 is a block diagram of a second conventional information processing apparatus.
Figure 4:
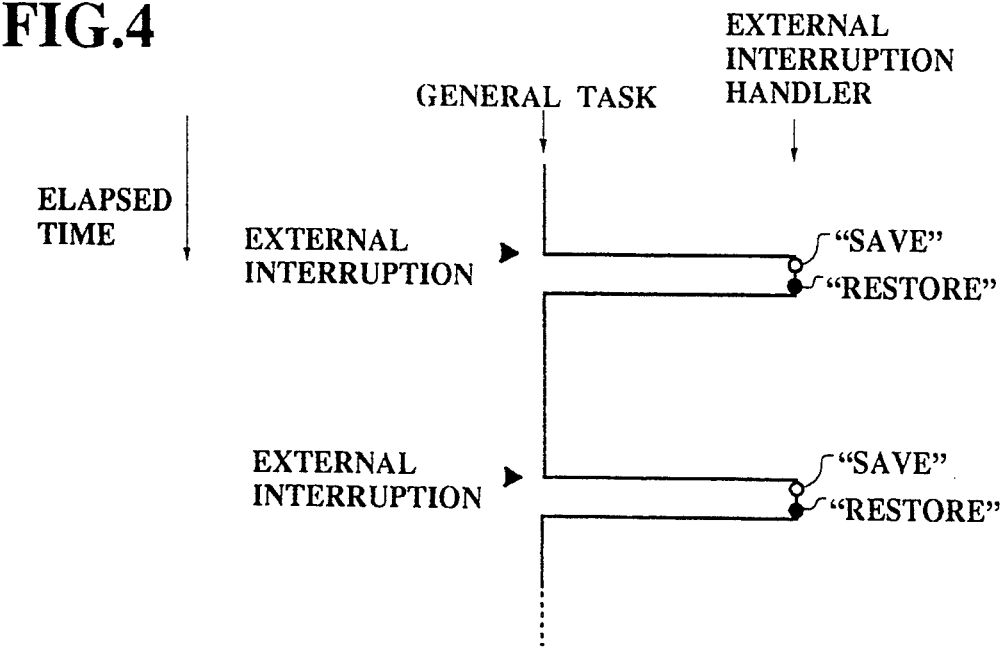
FIG. 4 is a time chart showing the replacement of application programs between a general task and a external-interruption-handler in the information processing apparatus shown in FIG. 5.
Figure 5:
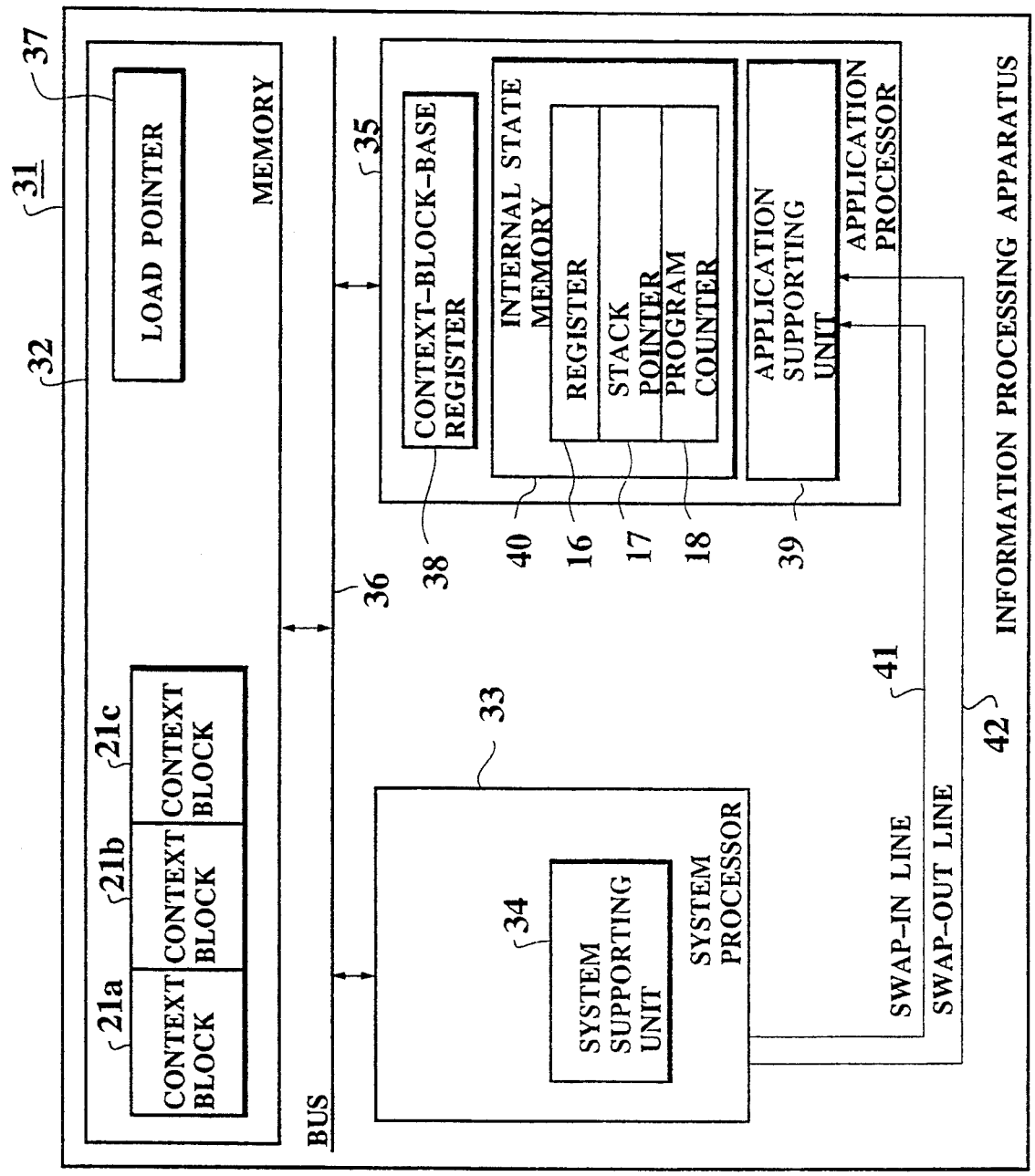
FIG. 5 is a block diagram of an information processing apparatus according to a first embodiment of a first aspect.

FIG. 5 is a block diagram of an information processing apparatus according to a first embodiment of the first aspect.

As shown in FIG. 5, an information processing apparatus 31 comprises:

a memory 32 for storing application programs and system programs;

a system processor 33 for executing the system programs stored in the memory 32 while being supported by a system supporting unit 34;

an application processor 35 for executing the application programs stored in the memory 32; and a bus 36 for transmitting the system programs from/to the system processor 33 and transmitting the application programs from/to the application processor 35.

The memory 32 comprises:

a plurality of context blocks 21 for storing contexts equivalent to contents of application programs AP1, AP2, and AP3 in the same manner as in a conventional information processing apparatus 11; and a load pointer 37 for pointing out an address of a context block 21 to the application processor 35 under the control of a system program. A context to be executed in the application processor 35 is stored in the specific context block 21.

The application processor 3S comprises:

a context-block-base register 38 for registering an address of a context block 21 in which a context to be executed in the application processor 35 is stored after being pointed out the address by the load pointer 37;

an application supporting unit 39 for supporting the execution of the application program AP1, AP2, or AP3; and an internal state memory 40 for executing the context which is stored in the context block 21 of which the address is registered in the context-block-base register 38 while being supported by the application supporting unit 39, the internal state memory 40 having a register 16, a stack pointer 17 and a program counter 18 in the same manner as in the conventional information processing apparatus 11.

The application supporting unit 39 is, for example, a memory controller or a floating point arithmetic unit in the same manner as in the conventional information processing apparatus 11. And the system supporting unit 34 is an execution unit for executing special instructions of the system program. The application supporting unit 39 is operated to support the application processor 35 independently of the system supporting unit 34 supporting the system processor 33.

The system processor 33 and the application processor 35 are connected by a swap-in line 41 and a swap-out line 42. In the swap-in line 41, a swap-in request signal is transmitted to the application processor 35 from the system processor 33. In the swap-outline 42, a swap-out request signal is transmitted to the application processor 35 from the system processor 33. When the swap-out request signal is provided to the application processor 35 under the control of the system program, a context under execution in the application processor 35 is swapped out to a prescribed context block 21. On the other hand, when the swap-in request signal is provided to the application processor 35 under the control of the system program, a context which is to be executed in the application processor 35, for example, after swapping out a previous context is swapped in the application processor 35 from a prescribed context block 21 which is pointed out to the application processor 35 by the load pointer 37.

In the above configuration of the information processing apparatus 31, the operations for executing an application program AP1 stored in the context block 21a, an application program AP2 stored in the context block 21b, and an application program AP3 stored in the context block 21c under time sharing are described with reference to FIG. 6.

Figure 6:
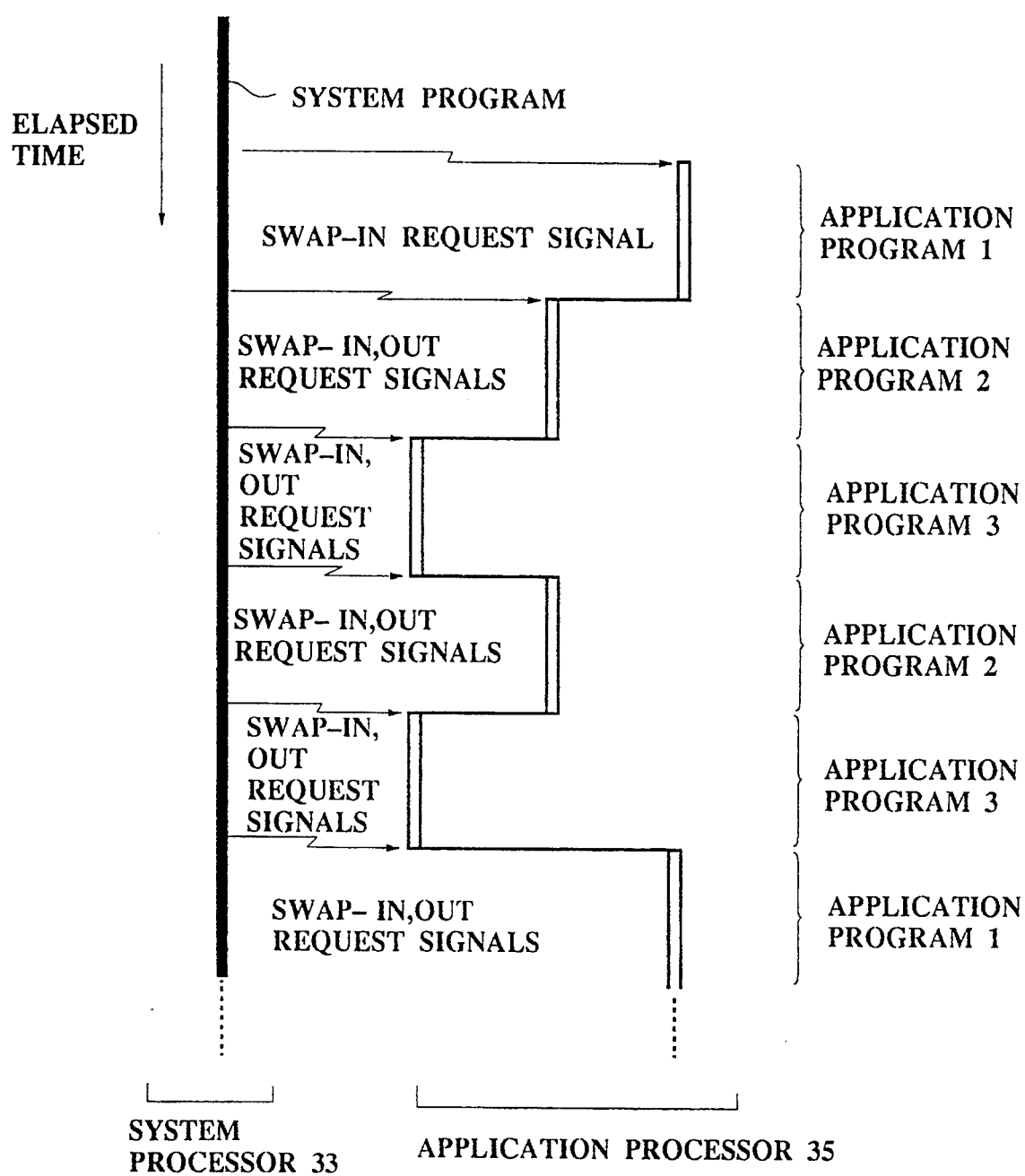
FIG. 6 is a time chart showing the operation in a system processor and an application processor in the information processing apparatus shown in FIG. 5.

FIG. 6 is a time chart showing the operation in the system processor 33 and the application processor 35 according to the first embodiment of the first aspect.

As shown in FIG. 6, when the information processing apparatus 31 is initially started, a prescribed system program is executed in the system processor 33 while being supported by the system supporting unit 34. At this time, the operation in the application processor 35 is stopped because no application program to be executed in the application processor 35 exists.

Thereafter, under the control of the system program, a context equivalent to the contents of, for example, the application program AP1 being set to the start condition is stored in the context block 21a. In detail, the initial conditions or values for initializing the register 16, the stack pointer 17 and the program counter 18 are stored in the context block 21a.

Then, the address of the context block 21a is written in the load pointer 37 for preparing the operation in the application processor 35.

Thereafter, a swap-in request signal is transmitted to the application processor 35 from the system processor 33 through the swap-in line 41 under the control of the system program. When the swap-in request signal is received by the application processor 35, a load procedure for loading the context stored in the context block 21a into the context-block-base register 38 is operated as an interruption process.

Figure 7:
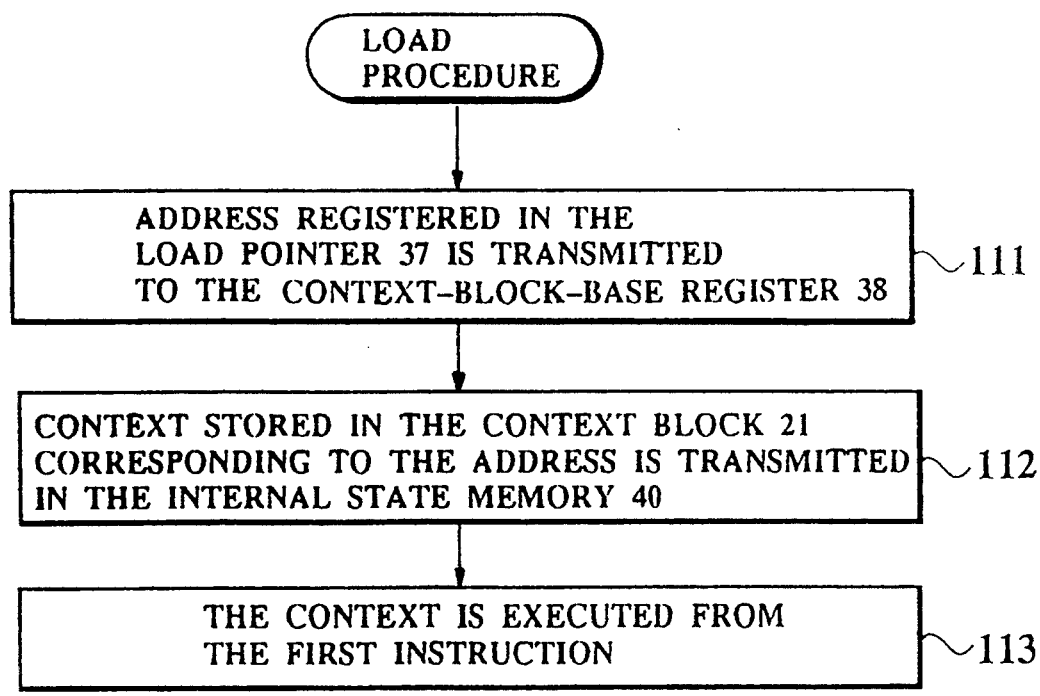
FIG. 7 is a flow chart showing the operation of a load procedure in the information processing apparatus shown in FIG. 5.

FIG. 7 is a flow chart showing the operation of the load procedure.

As shown in FIG. 7, when the load procedure is started, the address registered in the load pointer 37 is transmitted to the context-block-base register 38 under the control of the system program in a step 111.

In a step 112, the context stored in the context block 21a which corresponds to the address transmitted to the context-block-base register 38 is swapped in the internal state memory 40. Therefore, the register 16, the stack pointer 17 and the program counter 18 are respectively set to an initial condition.

In a step 113, an instruction which exists in a first address designated by the program counter 18 is initially executed and other instructions are executed in sequence. That is, the application program AP1 is executed in sequence in the application processor 35 while being supported by the application supporting unit 39.

Next, the operation that the application program AP1 being executed in the application processor 35 is replaced with, for example, the application program AP2 to be put in execution is described. This replacement is performed when the replacing operation is internally requested for some reason. Therefore, a prescribed system program is executed.

Initially, a swap-out request signal is transmitted to the application processor 35 from the system processor 33 through the swap-outline 42 under the control of the system program. When the swap-out request signal is received by the application processor 35, a store procedure for storing the context being executed the application processor 35 in the context block 21a is operated as an interruption process.

Figure 8:
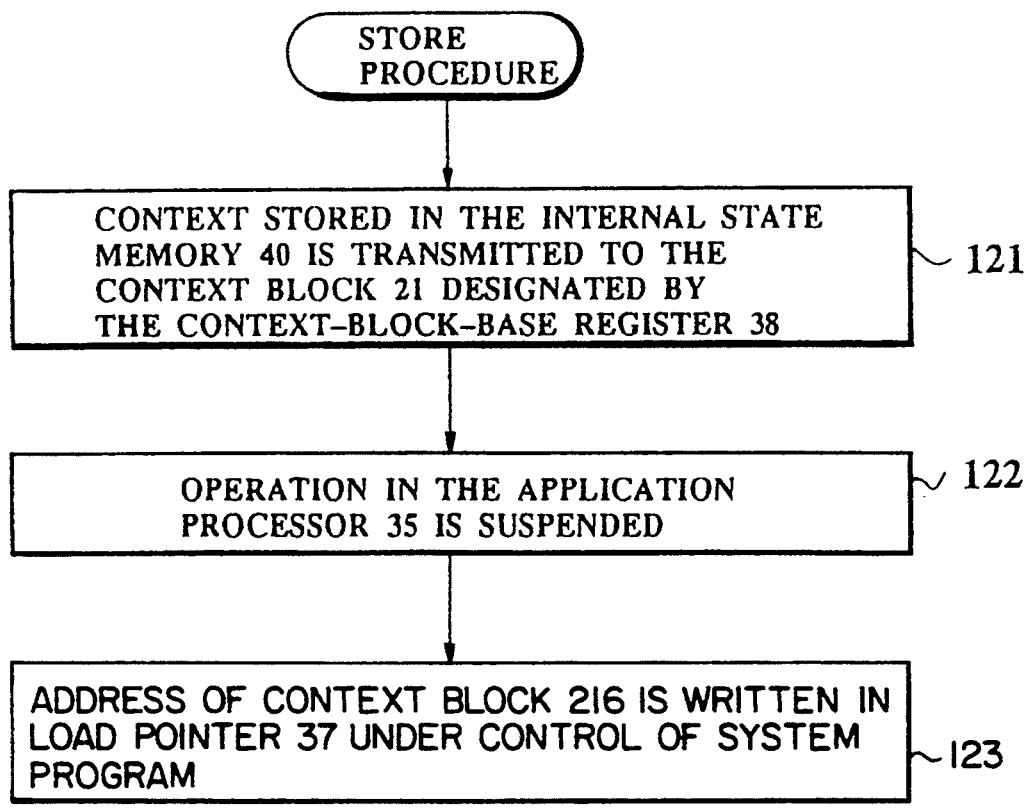
FIG. 8 is a flow chart showing the operation of a store procedure in the information processing apparatus shown in FIG. 5.

FIG. 8 is a flow chart showing the operation of the store procedure.

As shown in FIG. 8, when the store procedure is started, the contents of the application program AP1 are transmitted to the context block 21a under the control of the system program in a step 121. The context block 21a is a specific block corresponding to the address registered in the context-block-base register 38. The contents of the application program AP1 are not in the initial condition but in a suspended condition because the context is compulsorily suspended when it is in execution. Therefore, the context in the suspended condition is equivalent to the values designated by the program counter 18 and the like which have been utilized when the execution is suspended. Moreover, the previous context which has already been stored in the context block 21a is replaced with the suspended context. Further, the suspended context is executed when it is again transmitted to the internal state memory 40.

In a step 122, the operation in the application processor 35 is suspended.

In a step 123, the address of the context block 21b is written in the load pointer 37 under the control of the system program, then a swap-in request signal is transmitted to the application processor 35 from the system processor 33 through the swap-in line 41 under the control the system program. When the swap-in request signal is received by the application processor 35, the load procedure is started as an interruption process in the same manner as the load previously described herein before with reference to FIG. 7.

As a result, the application program AP2 is executed in the application processor 35 while being supported by the application supporting unit 39.

In the same manner, as shown in FIG. 6, the application programs AP1, AP2, and AP3 are sequentially executed with no loss of the execution time by the execution of the system program.

Accordingly, in the system processor 33, the system program can be executed to determine the next application program to be executed in the application processor 35 while being supported by the system supporting unit 33 independently of the execution of an application program to be executed in the application processor 35 while being supported by the application supporting unit 39.

That is, when an internal interruption occurs, the system program is executed to determine the next application program to be executed in the application processor 35 without suspending the execution of an application program being executed in the application processor 35. Then, after determining the next application program, the execution of the application program being in execution in the application processor 35 is suspended to swap out the program to a corresponding context block 21 and swap the next application program into the internal state memory 40 from a corresponding context block 21.

The processing time between the swap-out operation and the swap-in operation is considerably shorter than the processing time between the occurrence of the internal interruption and the determination of the next application program.

Accordingly, because the system supporting unit 34 is executed independently of the execution of the application supporting unit 39, the execution of the application program is not virtually prevented by the execution of the system program.

Moreover, the total time of the execution of the application program can be greatly improved.

Further, because the application supporting unit 39 can always be operated without being prevented by the execution of the system program supported by the system supporting unit 34, the application supporting unit 39 can be efficiently utilized.

Furthermore, because the application supporting unit 39 can be efficiently utilized, the amount of operation of the information processing apparatus 31 greatly increases so that the system supporting unit 34 can be efficiently utilized.

Figure 9:
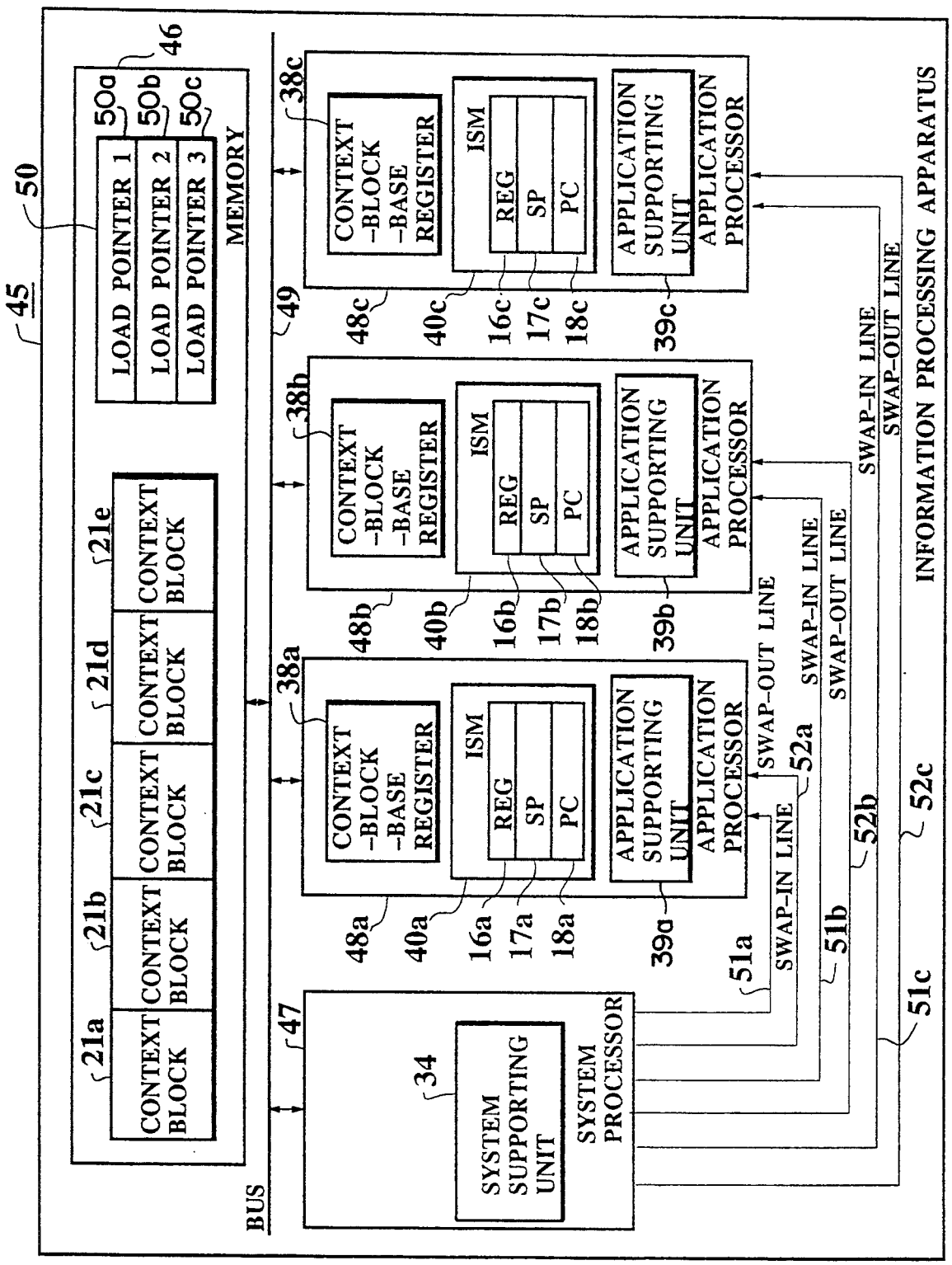
FIG. 9 is a block diagram of an information processing apparatus according to a second embodiment of the first aspect.

Next, a second embodiment according to the first aspect of the present invention is described to achieve the first object with reference to FIG. 9.

FIG. 9 is a block diagram of an information processing apparatus according to the second embodiment of the first aspect.

As shown in FIG. 9, an information processing apparatus 45 comprises:
 a memory 46 for storing application programs and system programs;
 a system processor 47 for executing the system programs stored in the memory 46 while being supported by the system supporting unit 34;
 a plurality of application processors 48 (48a, 48b, and 48c) for executing the application programs stored in the memory 46; and
 a bus 49 for transmitting the system programs from/to the system processor 47 and transmitting the application programs from/to the application processors 48.

The memory 46 comprises:
 the context blocks 21 (21a, 21b, 21c, 21d, and 21e) for storing contexts equivalent to the contents of application programs in the same manner as in the conventional information processing apparatus 11; and
 a plurality of load pointers 50 (50a, 50b, and 50c) for pointing out the addresses of the context blocks 21 to the corresponding application processors 48 under the control of a system program.

In each context block 21a, 21b, 21c, 21d, or 21e, a corresponding application program AP1, AP2, AP3, AP4, or AP5 is stored. Moreover, an address of a context block 21 is stored in a load pointer 50. Each load pointer 50a, 50b, or 50c corresponds to an application processors 48a, 48b, or 48c.

Each application processor 48a, 48b, or 48c comprises:
 the context-block-base register 38 (38a, 38b, or 38c) for registering an address of a context block 21 in which a context to be executed in the application processor 48 is stored after is pointed out the address by a corresponding load pointer 50a, 50b, or 50c;
 the application supporting unit 39 (39a, 39b, or 39c) for supporting the execution of the application program; and the internal state memory 40 (40a, 40b, or 40c) for executing the context which is stored in the context block 21 of which the address is registered in the context-block base register 38 while being supported by the application supporting unit 39, the internal state memory 40 having the register 16 (16a, 16b, or 16c), the stack pointer 17 (17a, 17b, or 17c) and the program counter 18 (18a, 18b, or 18c) in the same manner as in the conventional information processing apparatus 11.

The system processor 47 and each application processor 48a, 48b, or 48c are connected by a swap-in line 51 (51a, 51b, or 51c) for transmitting a swap-in request signal to the application processors 48 from the system processor 47 and a swap-out line 52 (52a, 52b, or 52c) for transmitting a swap-out request signal to the application processor 48 from the system processor 33. When the swap-out request signal is provided to the application processor 48 under the control of the system program, a context being executed in the application processor 48 is swapped out to a prescribed context block 21. On the other hand, when the swap-in request signal is provided to the application processor 48 under the control of the system program, a context which is to be executed in the application processor 48, for example, after swapping out a previous context is swapped in the application processor 48 from a prescribed context block 21 which is pointed out to the application processor 48 by the load pointer 50.

In the above configuration of the information processing apparatus 45, the operation for executing the application program AP1, AP2, AP3, AP4, or AP5 stored in the context blocks 21 is described.

When the information processing apparatus 45 is initially started, a prescribed system program is executed in the system processor 47 while being supported by the system supporting unit 34. At this time, the operation in the application processors 48 is stopped because no application program to be executed in the application processors 48 exists.

Thereafter, for example, in the case where the application program AP1 is executed in the application processor 48a under the control of the system program, a context equivalent to the contents of the application program AP1 being set in the start condition is stored in the context block 21a. In detail, the initial conditions or values for initializing the register 16, the stack pointer 17 and the program counter 18 are stored.

Then, the address of the context block 21a is written in the load pointer 50a for preparing the operation in the application processor 48a.

Thereafter, a swap-in request signal is transmitted to the application processor 48a from the system processor 47 through the swap-in line 51a under the control of the system program. When the swap-in request signal is received by the application processor 48a, the load procedure for loading the context stored in the context block 21a into the context-block-base register 38a is operated as an interruption process in the same manner as in the first embodiment.

That is, when the load procedure is started, the address registered in the load pointer 50a is transmitted to the context-block-base register 38a under the control of the system program. Then, the context stored in the context block 21a which corresponds to the address transmitted to the context-block-base register 38a is swapped in the internal state memory 40a. Therefore, the register 16, the stack pointer 17 and the program counter 18 are set to the initial condition.

An instruction which exists in a first address designated by the program counter 18a is executed and other instructions are executed in sequence. That is, the application program AP1 is executed in sequence in the application processor 48a while being supported by the application supporting unit 47.

In the same manner, the other application programs AP2, AP3, AP4, AP5 are simultaneously executed in the application processors 48a, 48b.

Next, the operation in which the application programs being executed in the application processors 48 are replaced is described.

As an example, the operation in which the application program AP2 being executed in the application processor 48b is replaced with the application program AP5 to put in execution is described.

This replacement is performed when a request for replacing the application program AP2 with the application program AP5 is provided to the system processor 47 and the system program is executed in the system processor 47.

Initially, a swap-out request signal is transmitted to the application processor 48b from the system processor 47 through the swap-outline 52b under the control of the system program. When the swap-out request signal is received by the application processor 48b, the store procedure for storing the context being executed in the application processor 48b in the context block 21b is operated as an interruption process in the same manner as in the first embodiment.

That is, when the store procedure is started, the contents of the application program AP2 are transmitted to the context block 21b corresponding to the address registered in the context-block-base register 38b under the control of the system program. The contents of the application program AP2 are not in the initial condition but in a suspended condition because the context is compulsorily suspended when it is in execution. Therefore, the context in the suspended condition is equivalent to the values designated by the program counter 18b and the like which have been utilized when the execution is suspended. Moreover, the previous context which has already been stored in the context block 21a is replaced with the suspended context. Then, the operation in the application processor 48b is suspended.

Thereafter, the address of the context block 21e is written in the load pointer 37 under the control of the system program, then a swap-in request signal is transmitted to the application processor 48b from the system processor 47 through the swap-in line 51b under the control of the system program. When the swap-in request signal is received by the application processor 48b, the load procedure is started as an interruption process in the same manner as the load procedure previously described with reference to FIG. 7.

As a result, the application program AP5 is executed in the application processor 48b while being supported by the application supporting unit 39b.

Accordingly, a plurality of application programs can be executed in the information processing apparatus 45 independently and simultaneously because each application processor 48 is provided with the application support unit 39 so that the application processors 48 can be independently operated.

Moreover, the operation of the application processors 48 is not prevented by the execution of the system program in the system processor 47 because the system processor 47 can be operated while being supported by the system supporting unit 34 independently of the operation in the application units 48a–48c.

In addition, the total time of the execution of the application programs can be considerably improved because the operation of the application supporting units 39a–39c is not prevented by the execution of the system program supported by the system supporting units 39. Therefore, the application supporting units 39a–39 c can be efficiently utilized.

Furthermore, because the application supporting units 39a–39c can be efficiently utilized, the amount of operation of the information processing apparatus 45 greatly increases so that the system supporting unit 34 can be efficiently utilized.

Next, preferred embodiments according to a second aspect of the present invention to achieve the second object are described with reference to FIGS. 10 to 21.

Figure 10:
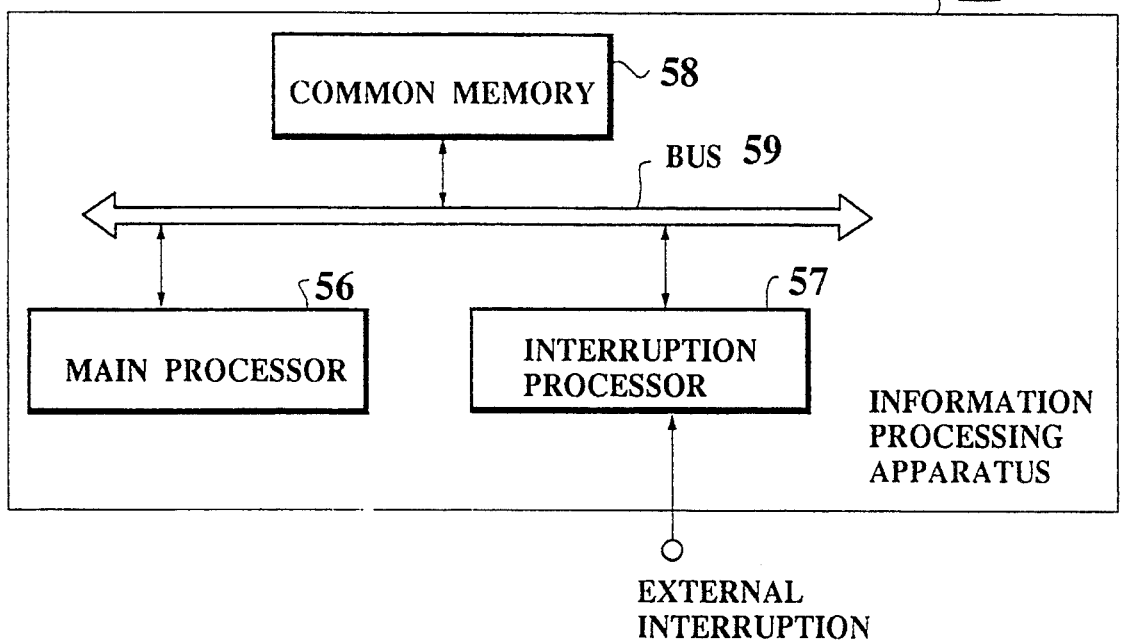
FIG. 10 is a block diagram of an information processing apparatus according to a first embodiment of a second aspect.

FIG. 10 is a block diagram of an information processing apparatus according to a first embodiment of the second aspect.

As shown in FIG. 10, an information processing apparatus 55 comprises:

a main processor 56 for executing a general task belonging to a group of application programs when an internal interruption does not occur and for processing an internal interruption when the internal interruption occurs;

an interruption processor 57 for executing an external-interruption-handler, belonging to a group of application programs, to process an external interruption when the external interruption is provided from outside the information processing apparatus 55 and for suspending any execution when no external interruption is provided;

a common memory 58 for storing system programs and application programs such as the general task and the external-interruption-handler, the application programs being executed in the main processor 56 and the interruption processor 57; and a bus 59 for transmitting the system programs and the application programs from/to the main processor 56 and the interruption processor 57.

In the above configuration of the information processing apparatus 55, the operation in the information processing apparatus 55 is described with reference to FIG. 11.

Figure 11:
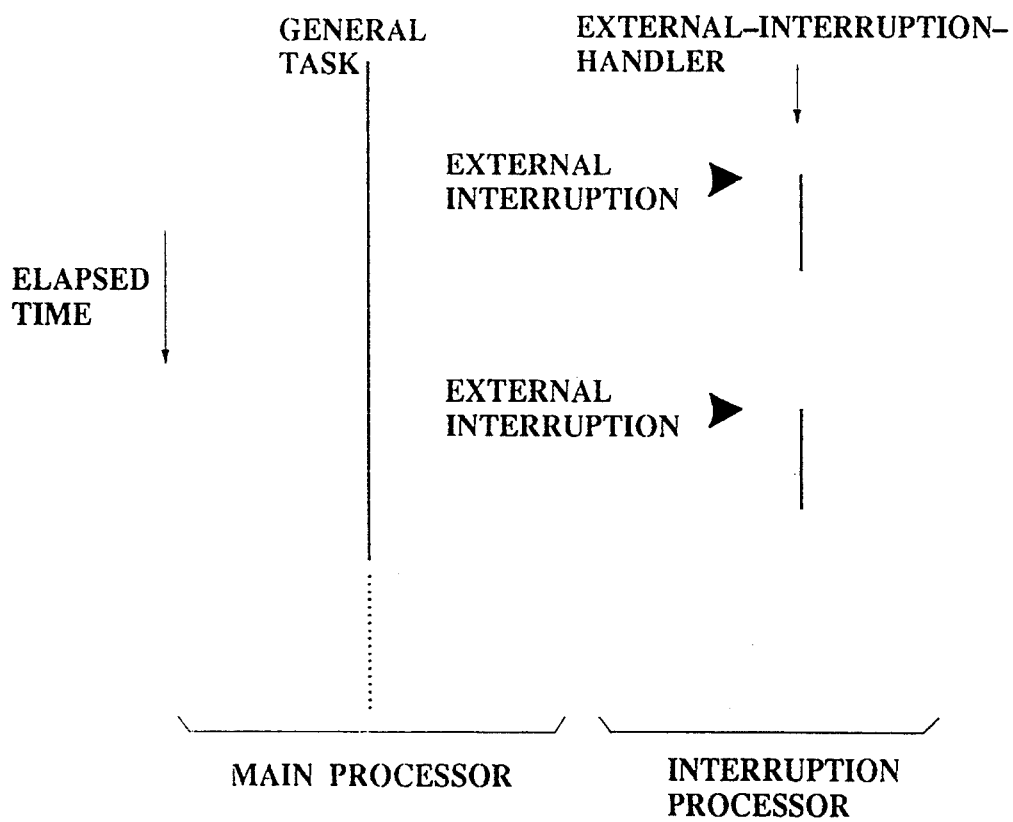
FIG. 11 is a time chart showing a procedure for executing a system-interruption-handler in the information processing apparatus shown in FIG. 10.

As shown in FIG. 11, as a typical operation, while no external interruption is provided to the interruption processor 57, the general task is executed in the main processor 56 and any execution in the interruption processor 57 is suspended.

When an external interruption is provided to the interruption processor 57, the external-interruption-handler stored in the memory 58 is transmitted to the interruption processor 8% and the execution of the external-interruption-handler is started in the interruption processor 57. When the execution of the external-interruption-handler is finished, the interruption processor 57 is again suspended.

In this case, the interruption processor 57 is operated independently of the operation in the main processor 57.

Therefore, the operation in the main processor 57 is continued during the operation in the interruption processor 57.

Accordingly, because the external-interruption-handler is executed in the independent interruption processor it is possible to store the contents of the external-interruption-handler in a register arranged in the interruption processor 57 at all times. Therefore, as for the register utilized in the execution of the external-interruption-handler, it is not necessary to save the contents stored in the register when the execution of the external-interruption-handler is started. Moreover, it is not necessary to restore the saved contents of the register to the register when the execution of the external-interruption-handler is finished. That is, it is not necessary to set a "SAVE" instruction in a first section in the external-interruption-handler, and it is not necessary block 21a which corresponds to the address transmitted to to set a "RESTORE" instruction in a final section in the external-interruption-handler.

Moreover, because the external-interruption-handler is executed simultaneous with the execution of the general task, the execution of the general task is not interrupted even if the external interruption is provided to the interruption processor 57.

Further, because the external handler is executed independently of the execution in the main processor 57, the main processor with a superior function can be efficiently utilized.

Therefore, all the drawbacks in the conventional information processing apparatus 31 can be solved and achieved the second object.

When the external interruption is provided to the interruption processor 57, the interruption processor 57 can be operated alone because the operation to process the external interruption is simple. However, when a special external interruption is provided to the interruption processor 57, in addition to the handling of a simple process by utilizing the external-interruption-handler, in certain cases it becomes necessary to handle a complicated process such as floating point arithmetic.

In this case, in the information processing apparatus 55, the general task executed in the main processor 56 must be interrupted and an interruption task belonging to a group of the application programs must be executed to handle the complicated process.

Therefore, a method for handling the above complicated process and an information processing apparatus for embodying the method are described with reference to FIGS. 12 to 14 as a second embodiment according to the second aspect of the present invention.

Figure 12:
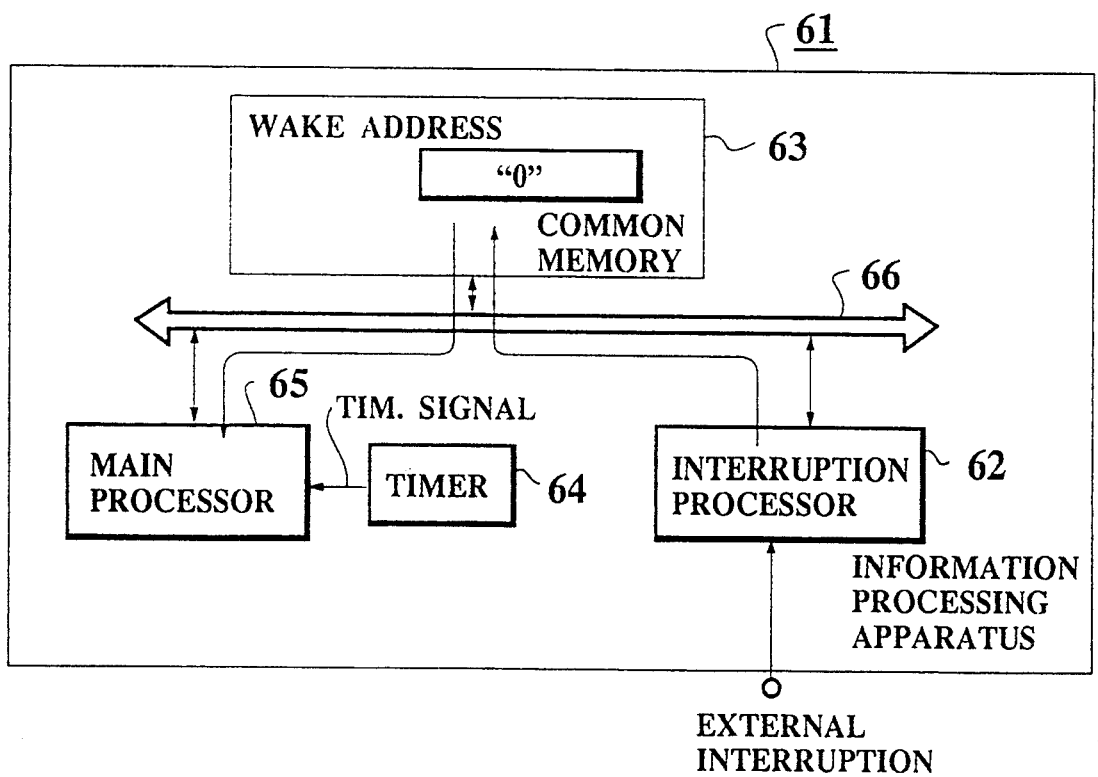
FIG. 12 is a block diagram of an information processing apparatus according to a second embodiment of the second aspect.

FIG. 12 is a block diagram of an information processing apparatus according to a second embodiment of the second aspect.

As shown in FIG. 12, an information processing apparatus 61 for processing an external interruption by utilizing application programs under the control of system programs, comprises:

an interruption processor 62 for processing a simple part of the process requested by the external interruption by the execution of an external-interruption-handler when the external interruption is provided, outputting a wake parameter for requesting the execution of an interruption task by executing a "WAKE" instruction programmed in the external-interruption-handler, and stopping any execution when no external interruption is provided;

a common memory 63 for storing the system programs such as a system-interruption-handler and the application programs such as a general task, the interruption task and the external-interruption-handler executed in the interruption processor and storing the wake parameter output by the interruption processor 62 in a wake address;

a timer 64 for generating timer interruption signals at regular intervals;

an main processor 65 for executing the general task stored in the common memory 63 when no timer interruption signal is provided from the timer 64, executing the system- interruption-handler stored in the common memory 63 to judge whether or not the wake parameter is stored in the wake address arranged in the common memory 63 by reading the contents of the wake address when the timer interruption signal is provided from the timer 64, and processing the remaining parts of the process requested by the external interruption by the execution of the interruption task stored in the common memory 63 in the case where it is Judged that the wake parameter is stored in the wake address; and a bus 66 for transmitting the system programs and the application programs among the common memory 63, the main processor 65 and the interruption processor 62.

In the above configuration, the operation in the information processing apparatus 61 is described as follows.

Figure 13:
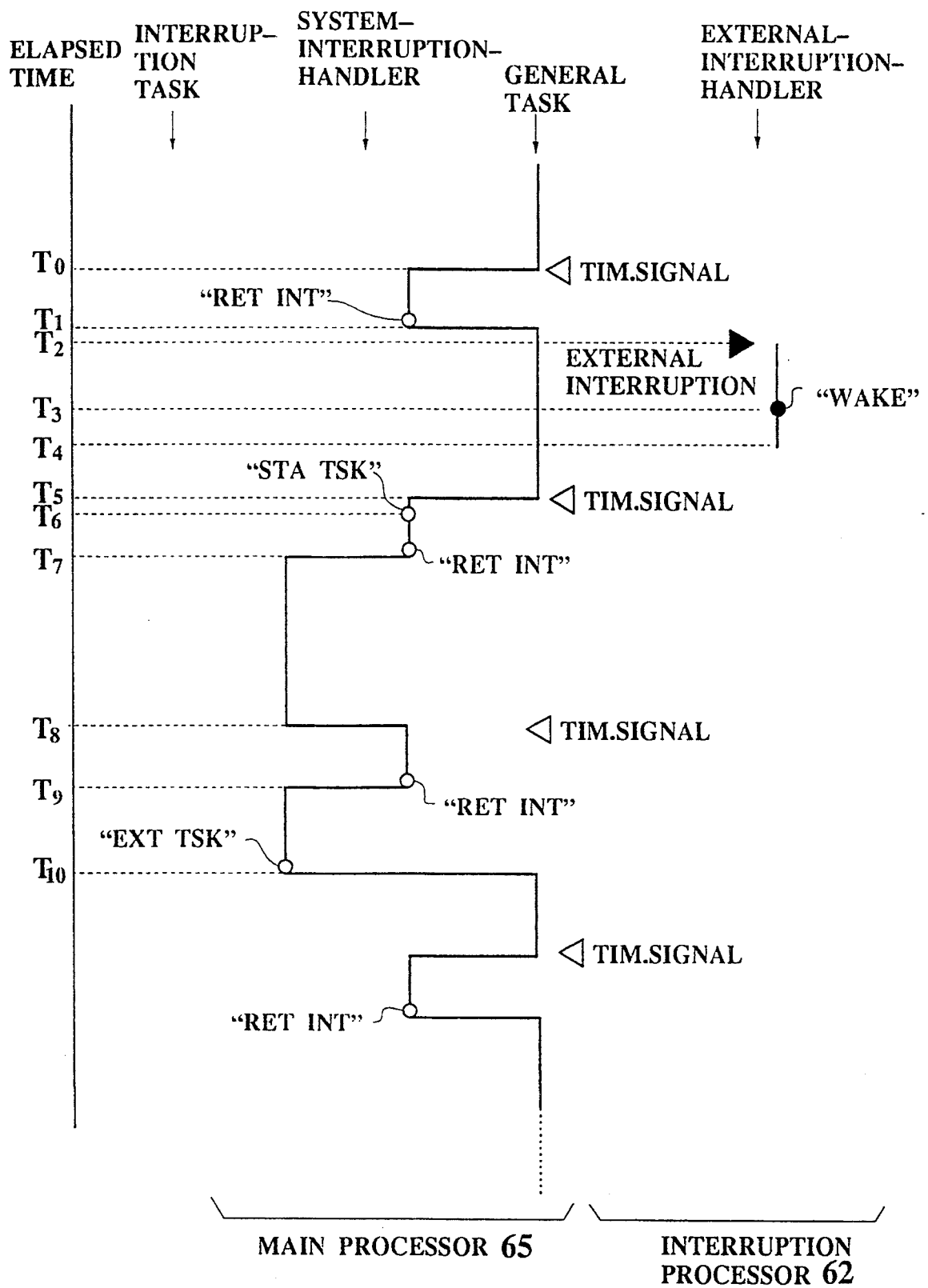
FIG. 13 is a time chart showing a procedure for executing a system-interruption-handler in the information processing apparatus shown in FIG. 12.

FIG. 13 is a time chart showing a procedure for executing the system-interruption-handler.

As shown in FIG. 13, in the case where no external interruption is provided to the interruption processor the general task is initially executed in the main processor 65. In this case, a timer-interruption signal is provided to the main processor 65 from the timer section 64 at regular intervals. Therefore, each time the timer interruption signal is provided to the main processor 65, the execution of the general task is interrupted so that a system-interruption-handler is executed in the main processor 65 at a time T0.

When the system-interruption-handler is executed, the main processor 65 is operated according to a prescribed program in which a prescribed procedure is programmed to execute the system-interruption-handler.

Figure 14:
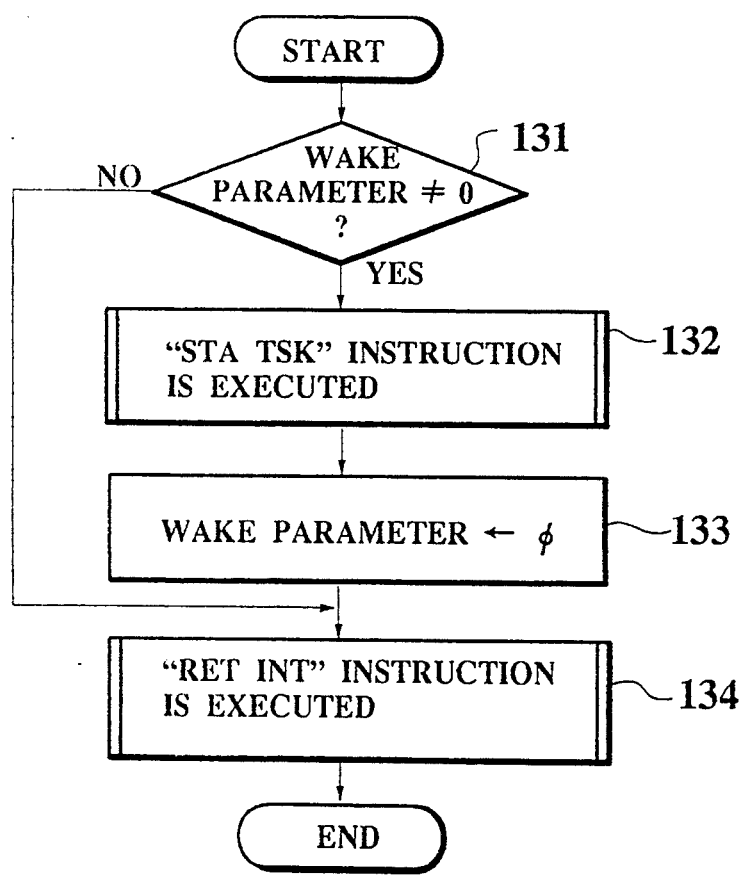
FIG. 14 is a flow chart showing the procedure for executing a system-interruption-handler in the information processing apparatus shown in FIG. 12.

FIG. 14 is a flow chart showing the procedure for executing the system-interruption-handler.

As shown in FIG. 14, when the system-interruption handler is executed in the main processor 65, the contents of the wake address is read out by the main processor 65 in a step 131. Thereafter, because the contents are initially set to "0" and no external interruption is provided to the interruption processor 62, the contents are "0" so that the procedure proceeds to a step 134.

In the step 134, a "ret int" instruction being one of system calls for determining a next task in the application programs to be executed in the main processor 65 is executed according to a prescribed schedule and the procedure is finished at a time T1.

In the main processor 65, a general real time operating system is operated. Therefore, the "ret int" instruction is issued to the general operating system and executed.

A detailed description as to the operating system omitted because it is not important to the present invention. The detailed description of the operating system is described in a reference (ITRON specifications "ITRON2 Ver.2.02.00.00" published by the TRON association).

During the above operation, the interruption processor 62 is not operated.

On the other hand, in the case where an external interruption is provided to the interruption processor 62, the execution of the external-interruption-handler is started in the interruption processor 62 at a time T2. By the execution of the external-interruption-handler, the "WAKE" instruction programmed in the external-interruption handler is executed at a time T3 so that the contents of the wake address are changed to "1" from "0". That is, the information designating the existence of the external interruption is stored in the common memory 63. Thereafter, the operation in the interruption processor 62 is stopped when the simple part of the process requested by the external interruption is executed by the external-interruption-handler and the execution of the external-interruption-handler is finished at a time T4.

As mentioned above, the interruption processor 62 operated independently of the operation in the main processor 65. Moreover, the operation in the main processor 5 is continued during the operation in the interruption processor 62.

When a timer-interruption signal is provided to the main processor 65 from the timer 64 at a time T5, the execution of the general task in the main processor 65 is interrupted so that the system-interruption-handler is executed. When the system-interruption-handler is executed, the main processor 65 is operated according to the prescribed procedure as shown in FIG. 14.

In the step 131, the contents of the wake address are read out by the main processor 65. Because the contents are changed to "1" by the wake parameter provided from the interruption processor 62, the procedure proceeds to a step 132.

In the step 132, a "sta tsk" instruction, being one of the system calls for executing an interruption task, is executed at a time T6. As a result, not only the general task is registered in a interrupt condition, but the interruption task is also registered in the main processor 65 for considering the execution of the interruption task in the real time operating system.

In a step 133, the contents of the wake address are returned to "0", and the procedure then proceeds to the step 134.

In the step 134, the "ret int" instruction is executed and the priorities in all the registered tasks are compared. After comparing the tasks, the task given the first priority is selected. In this case, because the registered tasks are the general task and the interruption task, and the interruption task is, for example, given the first priority in this embodiment, the interruption task is selected.

The method for designating the priority differs for each real time operating system and the method is not important. Therefore, a description of the method is omitted.

After the interruption task given the fist priority is selected, the execution of the system-interruption-handler is finished at a time T7. Thereafter, the interruption task is executed to process the remaining parts of the process requested by the external interruption in the main processor 65 while the execution of the general task Is kept in a interrupted condition.

During the execution of the interruption task in the main processor 65, in the case where a timer-interruption signal is provided to the main processor 65 from the timer 64, the execution of the interruption task is interrupted at a time T8 so that the system-interruption-handler is executed and finished at a time T9 as shown in FIG. 14.

After finishing the execution of the system-interruption-handler, the interruption task is again executed.

In a final section of the interruption task, an "ext tsk" instruction, being one of the system calls for instructing the operating system to delete the registration of the interruption task, is programmed. Therefore, when the execution of the interruption task is finished by the execution of the "ext tsk" instruction, the registration of the interruption task is deleted by the real operating system. Thereafter, the execution of the general task which has been interrupted is resumed at a time T10.

Accordingly, in the case where the external interruption includes a simple operation only, the external-interruption-handler is executed In the interruption processor 62 without executing the system-interruption-handler in the main processor 65. That is, the interruption processor 62 is operated independently of the main processor 65. On the other hand, in the case where a complicated operation must be processed in the information processing apparatus 61 because the external interruption includes not only a simple task but also a complicated task, the simple task is initially processed by executing the external-interruption-handler in the interruption processor 62, then the complicated task can be processed by executing the interruption task in the main processor 65 after the execution of the general task in the main processor is interrupted.

Moreover, the interruption processor 62 needs only a simple configuration. Therefore, the area of the circuitry for the interruption processor 62 can be small and the cost for making up the interruption processor 62 is small.

Next, a third embodiment of the second aspect according to the present invention is described with reference to FIGS. 15, 16.

On the occasion when an external interruption is provided to the interruption processor 64, a specific system call SC is executed by the operating system operated in the main processor 65 in this embodiment.

Figure 15:
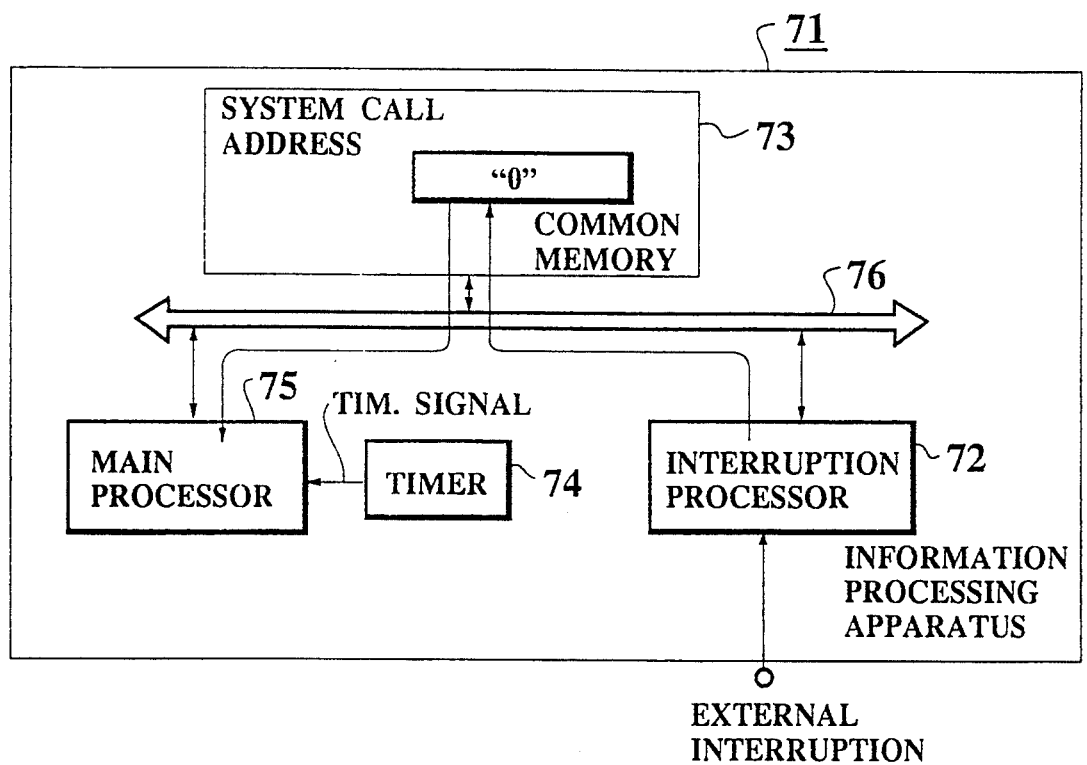
FIG. 15 is a block diagram of an information processing apparatus according to a third embodiment of the second aspect.

FIG. 15 is a block diagram of an information processing apparatus according to the third embodiment of the second aspect.

As shown in FIG. 15, an information processing apparatus 71 for processing an external interruption by utilizing application programs under the control of system programs and executing a prescribed system call, comprises:

an interruption processor 72 for processing the external interruption by the execution of an external-interruption-handler, outputting a system call parameter for requesting the execution of a prescribed system call by executing a "SCAL" instruction programmed in the external-interruption-handler according to the contents of the external interruption, and stopping any execution when no external interruption is provided;

an common memory 73 for storing the system programs such as a system-interruption-handler and the application programs such as a general task and the external- interruption-handler executed in the interruption processor 72 and storing the system call parameter output by the interruption processor 72 in a system call address;

a timer section 74 for generating timer interruption signals at regular intervals; and a main processor 75 for executing the general task stored in the common memory 73 when no timer interruption signal is provided from the timer section 74 and executing the system-interruption-handler stored in the common memory 73 when a timer interruption signal is provided from the timer section 74, the type of system call being judged by reading the contents of the system call parameter stored in the system call address during the execution of the system-interruption-handler, and the system call being executed according to the type of system call.

a bus 76 for transmitting the system-interruption-handler and the general task from/to the main processor 75 and transmitting the external-interruption-handler from/to the interruption processor 72.

The operation of the information processing apparatus 71 is described in the above configuration.

FIG. 16 is a time chart showing a procedure for executing the system-interruption-handler according to the third embodiment of the second aspect.

As shown in FIG. 16, in the case where no external interruption is provided to the interruption processor 72. The general task is initially executed in the main processor 75. In this case, a timer-interruption signal is provided to the main processor 75 from the timer section 74 at regular intervals. Therefore, each time the timer-interruption signal is provided to the main processor 75, the execution of the general task is interrupted so that a system-interruption-handler is executed In the main processor 75 at a time T0.

When the system-interruption-handler is executed, the main processor 75 is operated according to a prescribed program in which a prescribed procedure is programmed to execute the system-interruption-handler.

Figure 17:
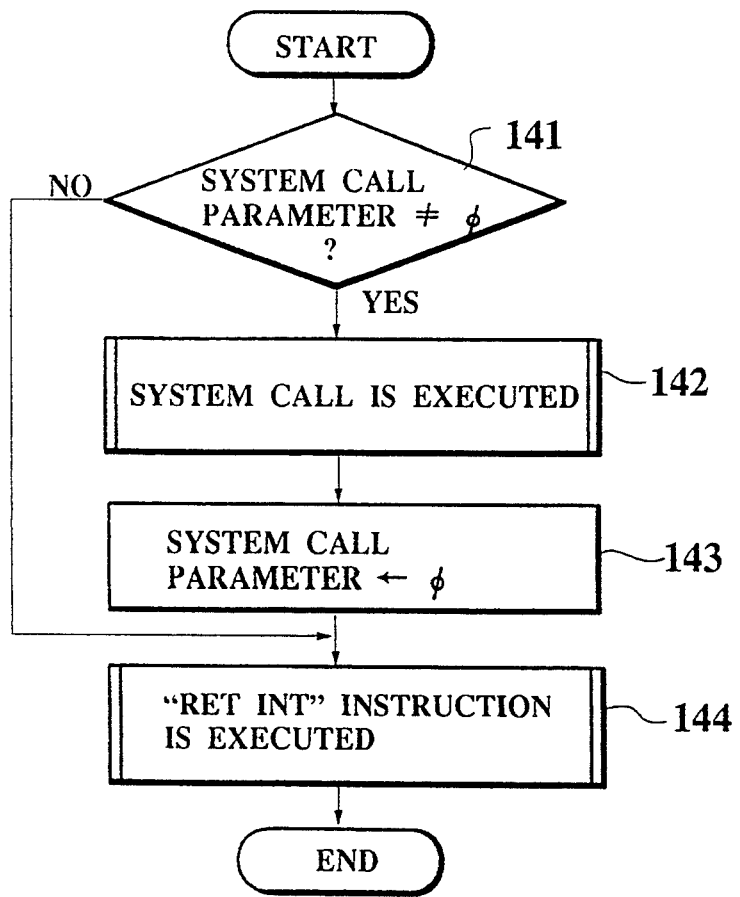
FIG. 17 is a flow chart showing the procedure for executing the system-interruption-handler in the information processing apparatus shown in FIG. 15.

FIG. 17 is a flow chart showing the procedure for executing the system-interruption-handler.

As shown in FIG. 17, when the system-interruption-handler is executed in the main processor 75, the contents of the system call address in the common memory 73 are read out by the main processor 75 in a step 141. Thereafter, because the contents are initially set to "0" and no external interruption is provided to the interruption processor 72, the contents are still "0" so that the procedure proceeds to a step 144.

In the step 144, a "ret int" instruction being one of the system calls for determining a next task in the application programs to be executed in the main processor 75 is executed according to a prescribed schedule and the procedure is finished at a time T1.

During the above operation, the interruption processor 72 is not operated.

On the other hand, in the case where an external interruption is provided to the interruption processor 72, the execution of the external-interruption-handler is started in the interruption processor 72 at a time T2. By the execution of the external-interruption-handler, the "SCAL" instruction programmed in the external-interruption-handler is executed at a time T3 so that a specific system call parameter is stored in the scal address.

The contents of the the system call parameter are determined according to the contents of the external interruption. For example, the system call parameter is "1", "2", —, or "n". Each system call parameter designates the execution of a specific type of system call as described hereinafter.

Thereafter, the operation in the interruption processor 72 is stopped when the execution of the external-interruption-handler is finished at a time T4.

As mentioned above, the interruption processor 72 is operated independently of the operation in the main processor 75. Moreover, the operation in the main processor 75 is continued during the operation in the interruption processor 72.

When a timer-interruption signal is provided to the main processor 75 from the timer section 74 at a time T5, the execution of the general task in the main processor 75 is interrupted so that the system-interruption-handler is executed. When the system-interruption-handler is executed, the main processor 75 is operated according to the prescribed procedure as shown in FIG. 17.

In the step 141, the contents of the system call address arranged in the common memory 73 are read out. In this case, because the contents are not "0" and the specific system call parameter is stored, the procedure proceeds to a step 142.

In the step 142, according to the type of specific system call parameter stored in the system call address of the common memory 73, an execution instruction for instructing the execution of a specific system call SC is executed. Therefore, the specific system call SC is executed in the operating system of the main processor In a step 143, the specific system call parameter is deleted so that the contents of the system call address are returned to "0".

In the step 144, the "ret int" instruction is executed and the procedure is finished at a time T6. Thereafter, the execution of the general task in an interrupt condition is resumed.

Accordingly, in the case where the external interruption includes only a simple task, the external-interruption-handler is executed in the interruption processor 72 without executing the system-interruption-handler in the main processor 75. That is, the interruption processor 72 is operated independently of the main processor 75. On the other hand, in the case where the specific system call SC must be executed in the operating system of the main processor 75, the specific system call SC can be executed by executing the system-interruption handler in the main processor 75 after the execution of the general task in the main processor 75 is interrupted.

In general, the main processor becomes more complicated year by year. On the other hand, the execution of the external-interruption-handler is easily performed in the interruption processor 72. Therefore, the interruption processor 72 can have a simple configuration. Therefore, the area of the circuitry for the interruption processor 72 can be small and the cost for making up the interruption processor 72 is small.

Next, a fourth embodiment of the second aspect according to the present invention is described with reference to FIG. 18.

Figure 18:
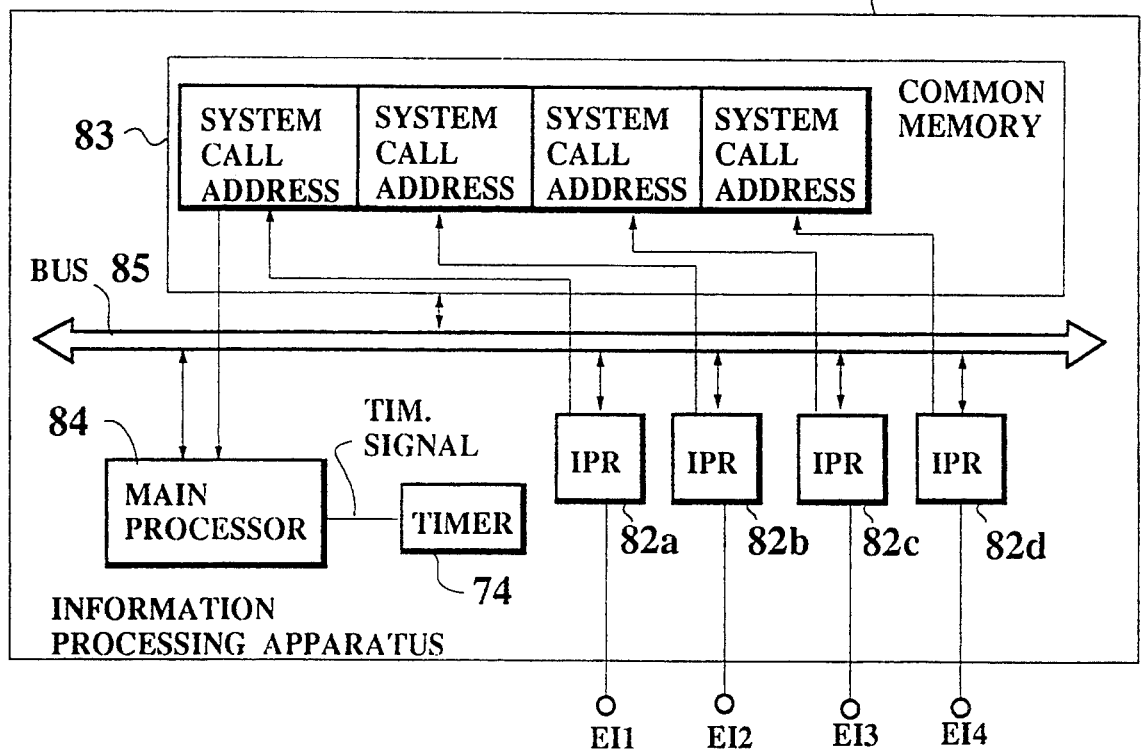
FIG. 18 is a block diagram of an information processing apparatus according to a fourth embodiment of the second aspect.

FIG. 18 is a block diagram of an information processing apparatus according to the fourth embodiment of the second aspect.

As shown in FIG. 18, an information processing apparatus 81 comprises a plurality of interruption processors 82 (82a, 82b, 82c, and 82d), a common memory the timer section 74, a main processor 84, and the bus 76.

In each interruption processor 82 (82a, 82b, 82c, or 2d), in the same manner as in the third embodiment, an corresponding external interruption EI1, EI2, EI3, or is processed by the execution of a corresponding external-interruption-handler EIH1, EIH2, EIH3, or EIh4 and a corresponding system call parameter SCP1, SCP2, SCP3, or SCP4 is output for requesting the execution of a corresponding prescribed system call SC1, SC2, SC3, or SC4 by executing a corresponding "SCAL" instruction programmed in the external-interruption-handler according to the contents of the external interruption. Moreover, the execution of each interruption processor 82 is stopped when no external interruption is provided.

In the common memory 83, the system programs such as a system-interruption-handler and the application programs such as a general task and the external-interruption-handlers executed in the interruption processors 82 are stored. Moreover, a plurality of system call addresses are arranged in the common memory 83 for storing the corresponding system call parameters output by the interruption processors 82.

In the main processor 85, the general task stored in the common memory 83 is executed when no timer interruption signal is provided from the timer section 74 and the system-interruption-handler stored in the common memory 73 is executed when a timer interruption signal is provided from the timer section 74.

Each type of system call is judged by reading the contents of the corresponding system call parameter stored in the corresponding system call address during the execution of the system-interruption-handler, and each system call is executed in the order designated in the system call addresses according to the type of system call.

In the above configuration, each external interruption is processed in each interruption processor 82 independently of the other interruption processors 82 in the same manner as in the third embodiment. Thereafter, each system call is executed in the main processor 84 according to the prescribed order.

Accordingly, because each interruption processor 82 is operated independently of the other interruption processors 82, the interruption processor 82 can be rapidly operated without being adversely affected by the other external interruptions.

It is preferable that each external interruption include the "WAKE" instruction and each wake parameter output by an interruption processor be provided to a corresponding wake address arranged in a common memory in the same manner as in the second embodiment. In this case, the remaining parts of the process requested by the external interruption are processed by the execution of an interruption task.

As mentioned above, in the second to fourth embodiments, the timer-interruption signal is provided to the main processor 65, 75, or 84 for executing the system-interruption-handler so that the communication between the interruption processor 62, 72, or 82 and the main processor 65, 75, or 84 is performed. Therefore, there is a drawback that the execution of the system-interruption-handler is delayed until the timer-interruption signal is provided to the main processor even if the external interruption has already been provided to the interruption processor. That is, the greatest amount of delayed time is the time interval between the occurrence of the timer-interruption signals.

To solve the above drawback, a fifth embodiment according to the second aspect is described with reference to FIGS. 19, 20.

Figure 19:
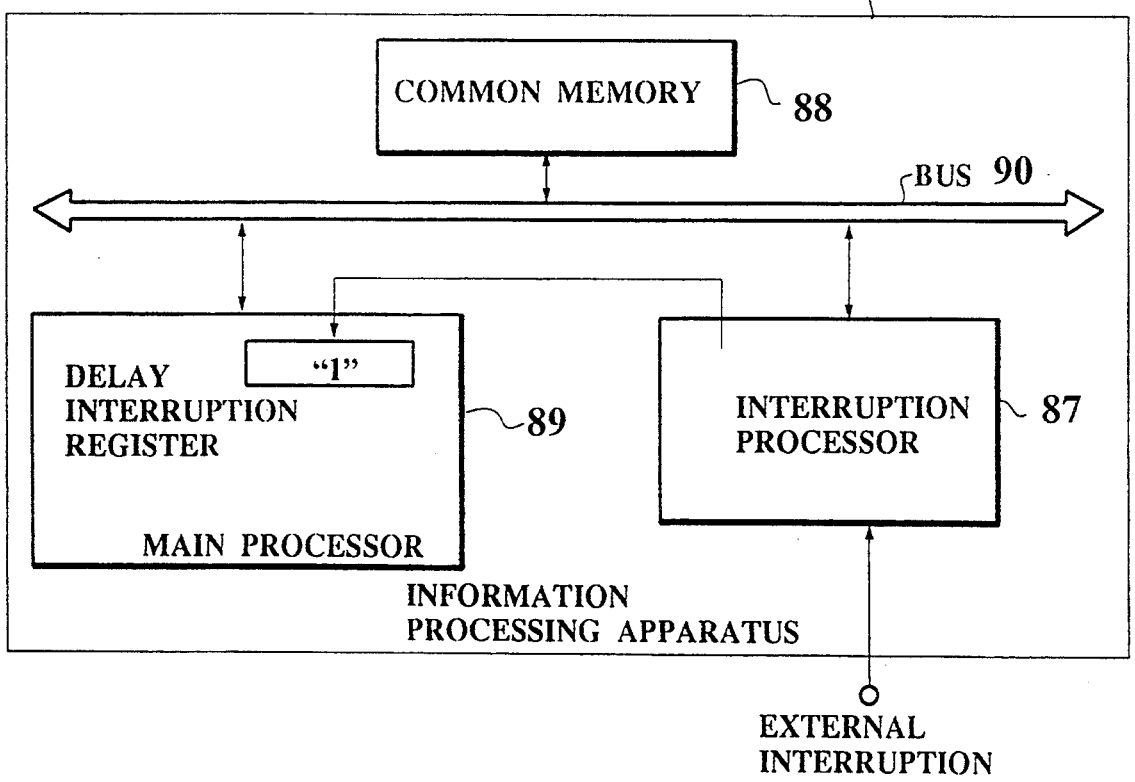
FIG. 19 is a block diagram of an information processing apparatus according to a fifth embodiment of the second aspect.

FIG. 19 is a block diagram of an information processing apparatus according to the fifth embodiment of the second aspect.

As shown in FIG. 19, an information processing apparatus 86 for processing an external interruption by utilizing application programs under the control of system programs, comprises:

an interruption processor 87 for processing a simple part of the process requested by the external interruption by the execution of an external-interruption-handler when the external interruption is provided, outputting a wake parameter for requesting the execution of an interruption task by executing a "WAKE" instruction programmed in the external-interruption-handler, and stopping any execution when no external interruption is provided;

a common memory 88 for storing the system programs such as a system-interruption-handler and the application programs such as a general task, the interruption task and the external-interruption-handler executed in the interruption processor 87;

an main processor 89, having a delay interruption register originally set to "1", for executing the general task stored in the common memory 88 when the contents of the delay interruption register are "1", and for executing the system-interruption-handler stored in the common memory 88 when the contents of the delay interruption register are changed to "0" by the "WAKE" instruction executed in the interruption processor 87, the remaining parts of the process requested by the external interruption being processed by the execution of the interruption task stored in the common memory 88 when the system-interruption handler is executed; and a bus 90 for transmitting the system programs and the application programs among the common memory 88, the main processor 89 and the interruption processor 87.

The operation of the information processing apparatus 86 with the above configuration is described with reference to FIG. 20 as follows.

Figure 20:
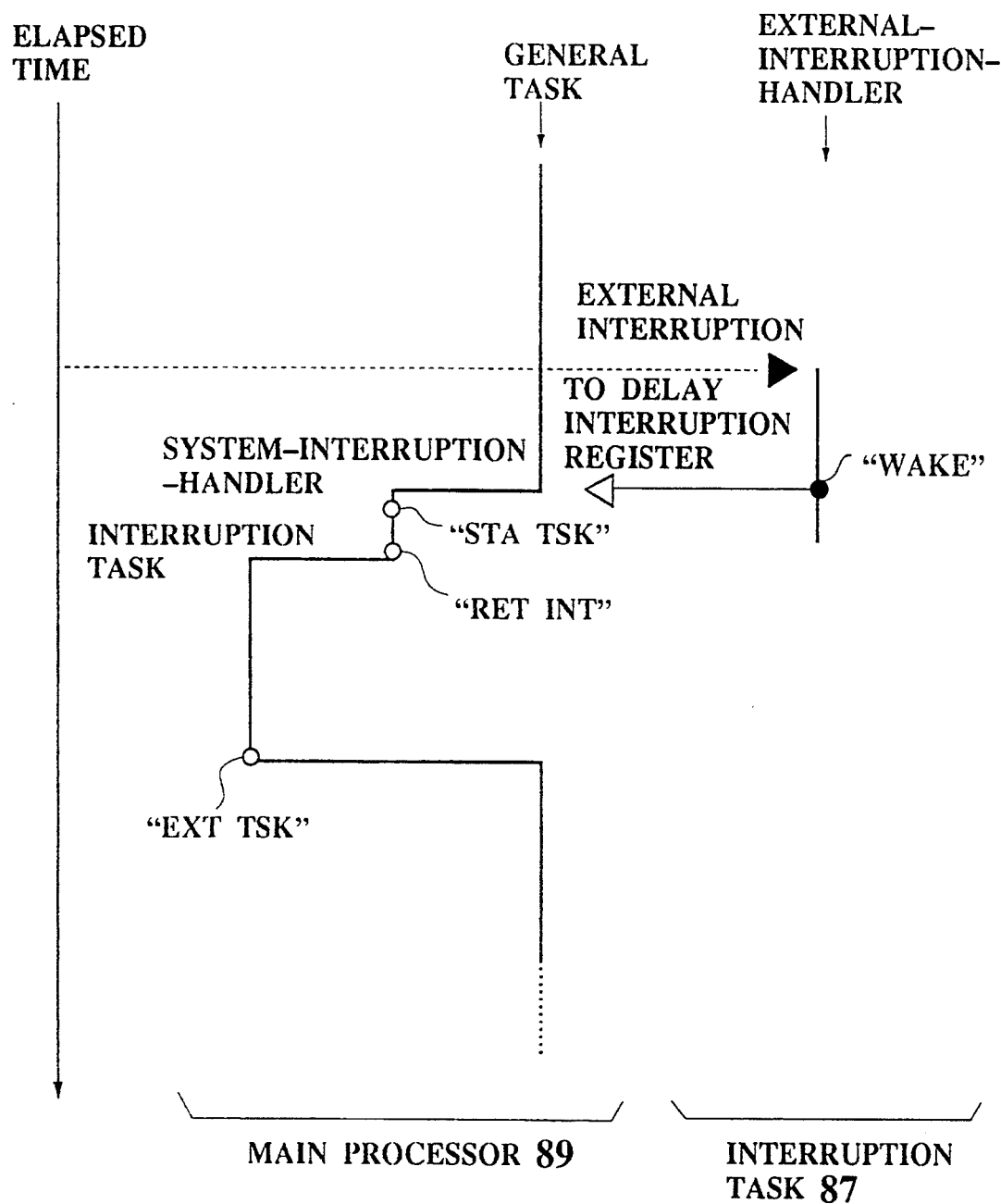
FIG. 20 is a time chart showing a procedure for executing a system-interruption-handler in the information processing apparatus shown in FIG. 19.

FIG. 20 is a time chart showing a procedure for executing the system-interruption-handler.

As shown in FIG. 20, in the case where no external interruption is provided to the interruption processor 87, the general task is initially executed in the main processor 89.

During the above operation, the interruption processor 62 is not operated.

When an external interruption is provided to the interruption processor 87, the execution of the external-interruption-handler is started in the interruption processor 87 at a time T0. By the execution of the external-interruption-handler, the "WAKE" instruction programmed in the external-interruption-handler is executed at a time T1 so that the contents of the delay interruption register arranged in the main processor 89 are changed to "0" from "1". That is, the information designating the existence of the external interruption is transmitted to the main processor 89.

Thereafter, in the interruption processor 87. The operation is stopped when the simple part of the process requested by the external interruption is executed by the external-interruption-handler and the execution of the external-interruption-handler is finished at a time T2.

As mentioned above, the interruption processor 87 is operated independently of the operation in the main processor 89. Moreover, the operation in the main processor 89 is continued during the operation in the interruption processor 87.

On the other hand, when the contents of the delay interruption register are changed to "0" at a time T1, the execution of the general task in the main processor 89 is interrupted so that the system-interruption-handler is executed.

A detailed description of the delay interruption technology is omitted because the technology is not important to the present invention. The detailed description of the delay interruption technology is described in a reference ("Specification of the Chip Based on the TRON Architecture Vet. 1.00. .00.00" published by the TRON association).

Figure 21:
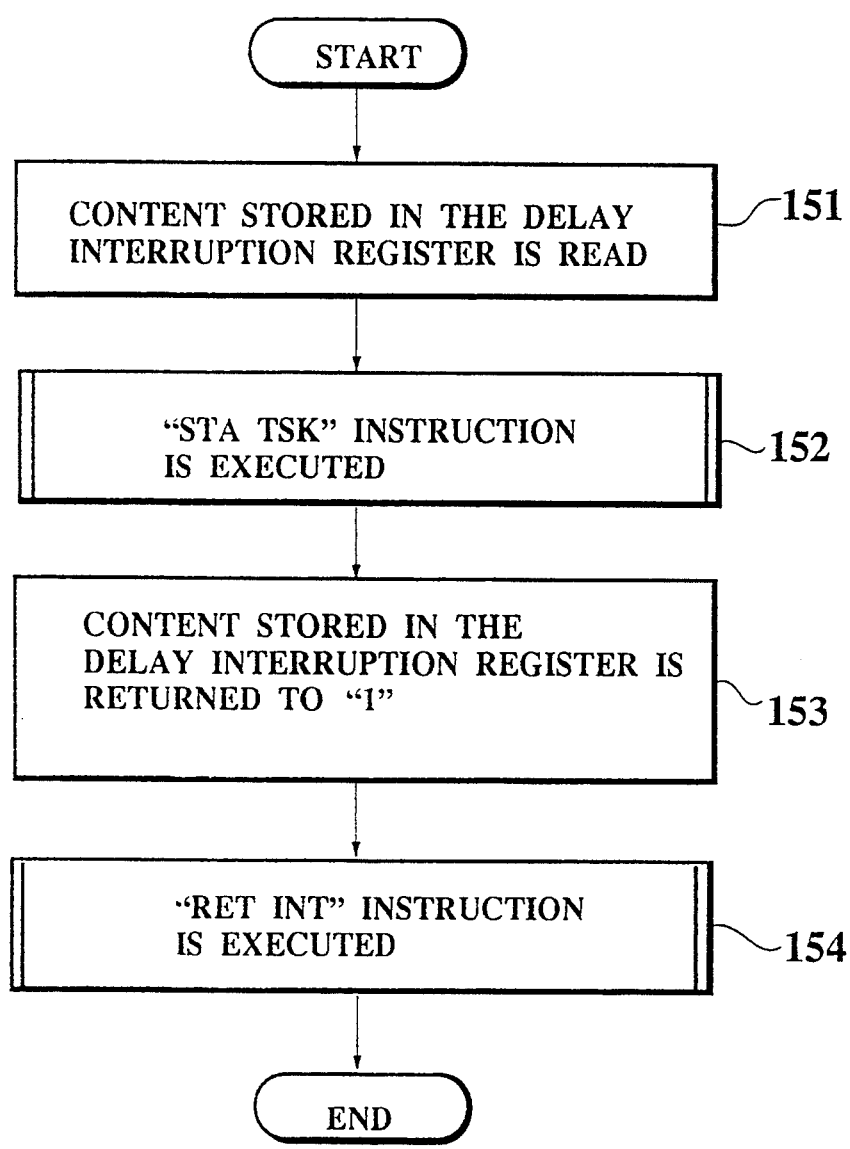
FIG. 21 is a flow chart showing the procedure for executing a system-interruption-handler in the information processing apparatus shown in FIG. 19.

When the system-interruption-handler is executed, the main processor 89 is operated according to the prescribed procedure as shown in FIG. 21.

FIG. 21 is a flow chart showing the procedure for executing the system-interruption-handler.

As shown in FIG. 21, in a step 151, the contents of the delay interruption register are read out in the main processor 89. Because the contents are changed to "1" by the the "WAKE" instruction executed in the interruption processor 87, the procedure proceeds to a step 152.

In the step 152, a "sta tsk" instruction, being one of the system calls for executing an interruption task, is executed. As a result, not only the general task is registered in a interrupt condition, but also the interruption task is registered in the main processor 89 for considering the execution of the interruption task in the real time operating system.

In a step 153, the contents of the delay interruption register are returned to "1", and then the procedure proceeds to a step 154.

In the step 154, the "ret int" instruction is executed in the same manner as in the second embodiment of the second aspect according to a prescribed schedule and the priorities of all the registered tasks is compared. After comparing the tasks, the task given the first priority is selected. In this case, because the registered tasks are the general task and the interruption task, for example, given the first priority in this embodiment, the interruption task is selected.

After the interruption task with the first priority is selected, the execution of the system-interruption-handler is finished at a time T3. Thereafter, the interruption task is executed to process the remaining parts of the process requested by the external interruption in the main processor 89 while the execution of the general task is kept in an interrupted condition.

In a final section of the interruption task, an "ext tsk" instruction being one of the system calls for instructing the operating system to delete the registration of the interruption task is programmed. Therefore, when the execution of the interruption task is finished by the execution of the "ext tsk" instruction, the registration of the interruption task is deleted by the real operating system. Thereafter, the execution of the general task which has been interrupted is resumed at a time T4.

Accordingly, even if the information processing apparatus 86 is provided with a small interruption processor, the external interruption can be efficiently processed in the same manner as in the second embodiment of the second aspect.

Moreover, when the request for executing the interruption task occurs because the external interruption is provided to the interruption processor 87, the request can be rapidly transmitted to the main processor 89. That is, the interruption task can be rapidly executed to process the remaining parts of the operation requested by the external interruption.

It is preferable that the information processing apparatus be provided with a plurality of interruption processors in the same manner as in the fourth embodiment of the second aspect.

As mentioned above, in the second to fifth embodiments, a plurality of processors such as the interruption processor and the main processor are connected to the same bus and the processor are independently operated. Therefore, a large volume of data and instructions is transmitted in the bus. As a result, there is a drawback that the operation of the processor is sometimes prevented by the operation of the other processors.

To solve the above drawback, a sixth embodiment is described with reference to FIG. 22.

Figure 22:
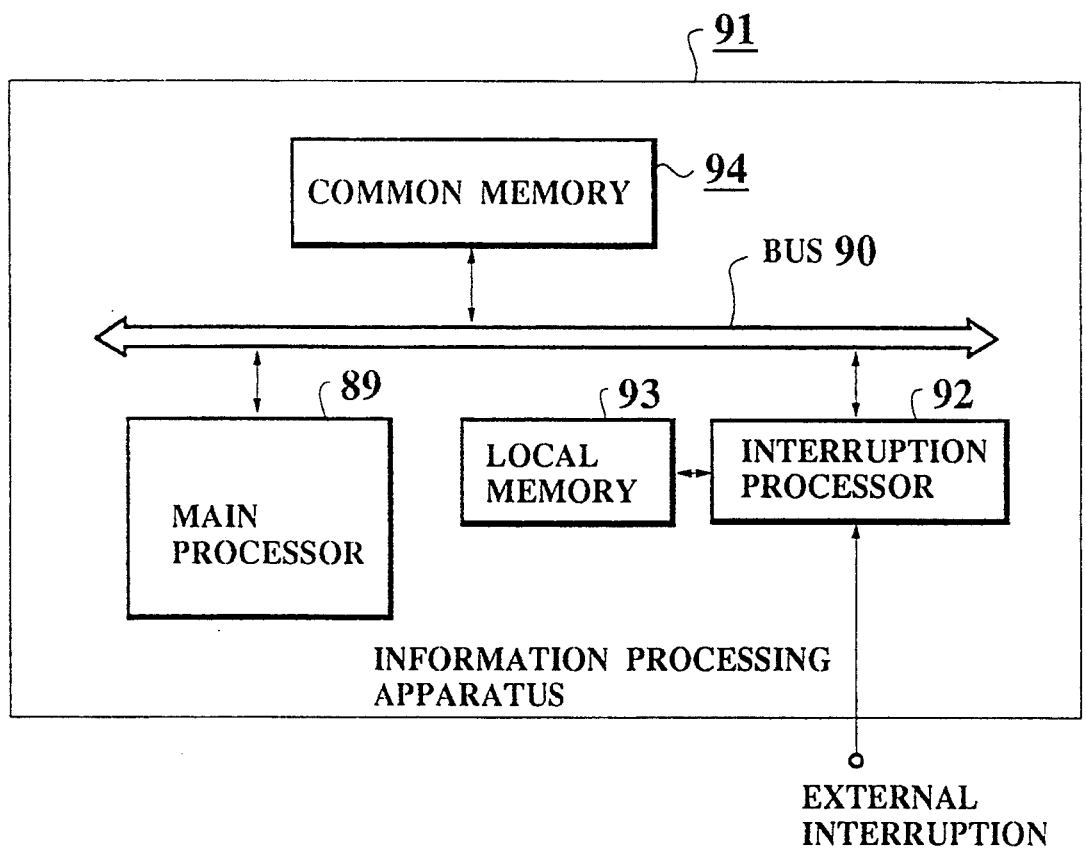
FIG. 22 is a block diagram of an information processing apparatus according to a sixth embodiment of the second aspect.

FIG. 22 is a block diagram of an information processing apparatus according to the sixth embodiment of the second aspect.

As shown in FIG. 22, an information processing apparatus 91 for processing an external interruption by utilizing application programs under the control of system programs, comprises:

an interruption processor 92 for processing a simple part of the process requested by the external interrupt/on by the execution of an external-interruption-handler when the external interruption is provided, outputting a wake parameter for requesting the execution of an interruption task by executing a "WAKE" instruction programmed in the external-interruption-handler, and stopping execution when no external interruption is provided;

a local memory 93 for storing the external-interruption-handler executed in the interruption processor 92;

a common memory 94 for storing the system programs such as a system-interruption-handler and the application programs such as a general task and an interruption task; the main processor 89 having a delay interruption register originally set to "1"; and the bus 90.

In the above configuration, when no external interruption is provided to the interruption processor 92, the general task is initially executed in the main processor 89.

During the above operation, the interruption processor is not operated.

When an external interruption is provided to the interruption processor 92, the external-interruption-handler is read out from the local memory 93 to the interruption processor 92 without passing through the bus 90. Thereafter, the execution of the external-interruption-handler is started in the interruption processor 92. By the execution of the external-interruption-handler, the "WAKE" instruction programmed in the external-interruption-handler is executed and prescribed processes are performed in the information processing apparatus 91 in the same manner as in the information processing apparatus 86 in the fifth embodiment.

When the execution of the external-interruption-handler is finished, the external-interruption-handler is recorded in the local memory 93 without passing through the bus 90.

The external-interruption-handler is generally small and the predetermined data accesses the external-interruption-handler. Therefore, the external-interruption-handler can be stored in the small local memory 93, while the simple part of the operation requested by the external interruption can only be processed by the external-interruption-handler.

Accordingly, because the external-interruption-handler is read by the interruption processor 92 and written to the local memory 93 without passing through the bus 90, the utilization frequency of the bus 90 can be decreased. That is, only small amounts of data and instructions are transmitted in the bus 90. As a result, the operations in the main processor 89 and the interruption processor 92 can be separated.

It is preferable that stack regions and data regions accessed by the external-interruption-handler be arranged in the local memory 93.

Moreover, it is preferable that the information processing apparatus 91 be provided with a plurality of interruption processors in the same manner as in the fourth embodiment of the second aspect.

Further, an information processing apparatus combining the all embodiments as mentioned above is available.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An information processing apparatus for executing a plurality of application programs under control of a system program, comprising:

memory means for storing said system program;

context blocks storing means for storing a plurality of context blocks, each of said plurality of context blocks corresponding respectively to a context of one of said plurality of application programs;

system control means including a system program executing means for controlling execution of said plurality of application programs;

load pointing means for pointing out an address of one of said plurality of context blocks under control of said system program executed in said system control means, said address of said one of said context blocks pointed out by said load pointing means being replaced with an address of a context block corresponding to a next one of said application programs, when said next one of said application programs is determined to be executed, under control of said system program executed in said system control means; and application program executing means, connected to said system program executing means through a swap in line and a swap out line, for executing said application program corresponding to said context block whose address is pointed out by said load pointing means, said application program being executed until said next one of said application programs is determined in said system control means and being replaced with said next one of said application programs, said application program executing means including;

a register for registering an address of said context block pointed out by said load pointing means; and an internal state memory for storing said context stored in said context block whose address is registered in said register;

wherein said system control means generates a swap-in request signal and a swap-out request signal along said swap-in line and said swap-out line, respectively, said swap-in request signal indicating a request for writing a context stored in said context block pointed out by said load pointing means to said internal state memory, and said swap-out request signal indicating a request for writing a context stored in said internal state memory to said context block pointed out by said load pointing means.

2. An apparatus according to claim 1, wherein said load pointing means including a plurality of load pointers for pointing out addresses of a plurality of context blocks; and said application program executing means includes a plurality of application processors, each of said application processors corresponding to a respective one of said load pointers, each of said application processors executing an application program corresponding to a context block whose address is pointed out by said application processor's corresponding load pointer.

3. An apparatus according to claim 1 in which said application supporting unit is a memory controller.

4. An apparatus according to claim 1 in which said application supporting unit is a floating point arithmetic unit.

5. An information processing apparatus for executing a plurality of application programs in parallel, said apparatus comprising:

a system processor for executing system programs which function to supervise execution of said plurality of application programs;

an application processor, connected to said system processor through a swap-in line and a swap-out line, being used to execute an application program; and a main memory connected to said system processor and said application processor through a bus line and containing a plurality of context blocks and a load pointer, said load pointer indicating one of said plurality of context blocks; wherein when a first application program currently being executed in said application processor is to be switched to a second application program to be executed in said application processor, said system processor outputs a swap-out request signal to said application processor through said swap-out line;

when said application processor receives said swap-out request signal from said system processor, said application processor saves a context of said first application program being executed in one of said context blocks indicated by said load pointer;

when said context of said first application program is saved in said one of said context blocks indicated by said load pointer, said system processor outputs a swap-in request signal to said application processor through said swap-in line; and when said application processor receives said swap-in request signal from said system processor, said application processor brings a context of said second application program in response to said swap-in request signal to initiate execution of said second application program as a new current application program.

6. A method for controlling execution of a plurality of application programs in an information processing system including a system processor, an application processor connected to said system processor via a swap-in line and a swap-out line, and a memory connected to said system processor and said application processor, said method comprising the steps of:

providing in said memory a plurality of context blocks;

storing in each of said plurality of context blocks context information consisting of processor status information respectively corresponding to said plurality of application programs;

indicating under control of said system processor a particular context block corresponding to a particular application program to be executed;

loading into an internal memory of said application processor particular context information stored in said particular context block in response to a swap-in command from said system processor;

executing said particular application program in said application processor;

pointing under control of said system processor to a new context block corresponding to a new application program to be executed;

swapping-out current context information stored in said internal memory and replacing context information stored in said particular context block with said current context information as suspended context information in response to a swap-out command from said system processor; and loading into said internal memory new context information from said new context block for processing said new application program to be executed.

7. A method as recited in claim 6 further comprising the steps of:

indicating after said swapping-out step said particular context block as corresponding to a next application program to be executed;

swapping out context information currently held in said internal memory; and loading said suspended context information into said internal memory from said particular context block to resume execution of said particular application program.

8. A method as recited in claim 6, wherein said executing step executing said particular application program continues execution of said particular application program while said system processor controls said pointing step.

* * * * *